(12) United States Patent
York

(10) Patent No.: US 8,476,579 B2
(45) Date of Patent: Jul. 2, 2013

(54) INDEXED OPTICAL ENCODER, METHOD FOR INDEXING AN OPTICAL ENCODER, AND METHOD FOR DYNAMICALLY ADJUSTING GAIN AND OFFSET IN AN OPTICAL ENCODER

(71) Applicant: FARO Technologies, Inc., Lake Mary, FL (US)

(72) Inventor: Frederick York, Longwood, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/656,110

(22) Filed: Oct. 19, 2012

(65) Prior Publication Data

US 2013/0116959 A1    May 9, 2013

Related U.S. Application Data

(62) Division of application No. 12/549,731, filed on Aug. 28, 2009, now abandoned.

(60) Provisional application No. 61/092,478, filed on Aug. 28, 2008, provisional application No. 61/224,657, filed on Jul. 10, 2009.

(51) Int. Cl.
*G01D 5/38* (2006.01)
*G01D 5/347* (2006.01)
*G06F 19/00* (2011.01)

(52) U.S. Cl.
USPC ............. 250/231.14; 250/231.16; 250/237 G

(58) Field of Classification Search
USPC ........... 250/231.14–231.18, 237 G; 324/161, 324/166, 175; 341/2, 3; 702/85, 94, 95, 104, 702/145, 147, 148, 150, 151
See application file for complete search history.

(56) References Cited

U.S. PATENT DOCUMENTS 3,187,187 A    6/1965    Wingate
3,307,039 A    2/1967    Aemmer
(Continued)

FOREIGN PATENT DOCUMENTS

CN    1171560 A    1/1998
EP    0361867    4/1990
JP    2005003559    1/2005

OTHER PUBLICATIONS

International Search Report and Written Opinion for Application No. PCT/US2009/055362; Mailing Date Jun. 10, 2010.

(Continued)

*Primary Examiner* — John Lee
(74) *Attorney, Agent, or Firm* — Cantor Colburn LLP

(57) ABSTRACT

An optical encoder may include an encoder disk, an illumination system, and a detector to detect light diffracted from the encoder disk. The encoder disk may include a signal track comprising a diffraction grating, and an index track comprising a reflective index mark, wherein a width of the index mark is larger than a pitch of the diffraction grating. An indexing method may include providing an encoder disk, providing an illumination system to direct light to the encoder disk, providing a detector structured to detect light diffracted from the encoder disk, calculating an estimated count of quadrature states from a rising edge of an index pulse to a middle of the index interval, and calculating the quadrature state at an approximate center of the index pulse. A dynamic parameter correction method may include calculating a target gain and offset and correcting values based on the target gain and offset.

8 Claims, 51 Drawing Sheets

U.S. PATENT DOCUMENTS

| | | | |
|---|---|---|---|
| 4,078,173 | A | 3/1978 | Fultz |
| 4,162,399 | A | 7/1979 | Hudson |
| 4,355,279 | A * | 10/1982 | Younge .......................... 324/161 |
| 4,410,798 | A | 10/1983 | Breslow |
| 4,524,347 | A | 6/1985 | Rogers |
| 4,602,155 | A | 7/1986 | LaPlante |
| 4,678,908 | A | 7/1987 | LaPlante |
| 4,712,000 | A | 12/1987 | Yoshikawa et al. |
| 4,794,251 | A | 12/1988 | Scholian |
| 4,920,259 | A | 4/1990 | Epstein |
| 4,945,231 | A | 7/1990 | Ohya et al. |
| 4,967,071 | A | 10/1990 | Park et al. |
| 5,003,170 | A | 3/1991 | Masuda et al. |
| 5,038,243 | A * | 8/1991 | Gordon ............................. 341/2 |
| 5,053,618 | A | 10/1991 | McElroy |
| 5,355,220 | A | 10/1994 | Kobayashi et al. |
| 5,486,923 | A | 1/1996 | Mitchell et al. |
| 5,559,600 | A | 9/1996 | Mitchell |
| 5,880,882 | A | 3/1999 | Michel et al. |
| 5,909,283 | A | 6/1999 | Eselun |
| 6,977,368 | B2 | 12/2005 | Drescher et al. |
| 7,002,137 | B2 | 2/2006 | Thorburn et al. |
| 7,012,677 | B2 | 3/2006 | Mutschler |
| 7,141,780 | B2 | 11/2006 | Homer et al. |
| 7,368,705 | B2 | 5/2008 | Hare et al. |
| 8,068,040 | B2 | 11/2011 | Wong et al. |
| 8,109,906 | B2 | 2/2012 | Smisson, III et al. |
| 2002/0000514 | A1 | 1/2002 | Haas et al. |
| 2003/0155489 | A1 | 8/2003 | Yasuda et al. |
| 2006/0126474 | A1 | 6/2006 | Hanks |
| 2006/0186360 | A1 | 8/2006 | Remillard et al. |
| 2007/0018084 | A1 | 1/2007 | Shimomura et al. |
| 2008/0156973 | A1 | 7/2008 | Wong et al. |
| 2010/0057392 | A1 | 3/2010 | York |

OTHER PUBLICATIONS

GB Search Report for GB Application Serial No. GB1212858.3; Date of Report Feb. 28, 2013.

\* cited by examiner

Optical Encoder Disk

30

36, 37, 32, 35, 34

Encoder Disk

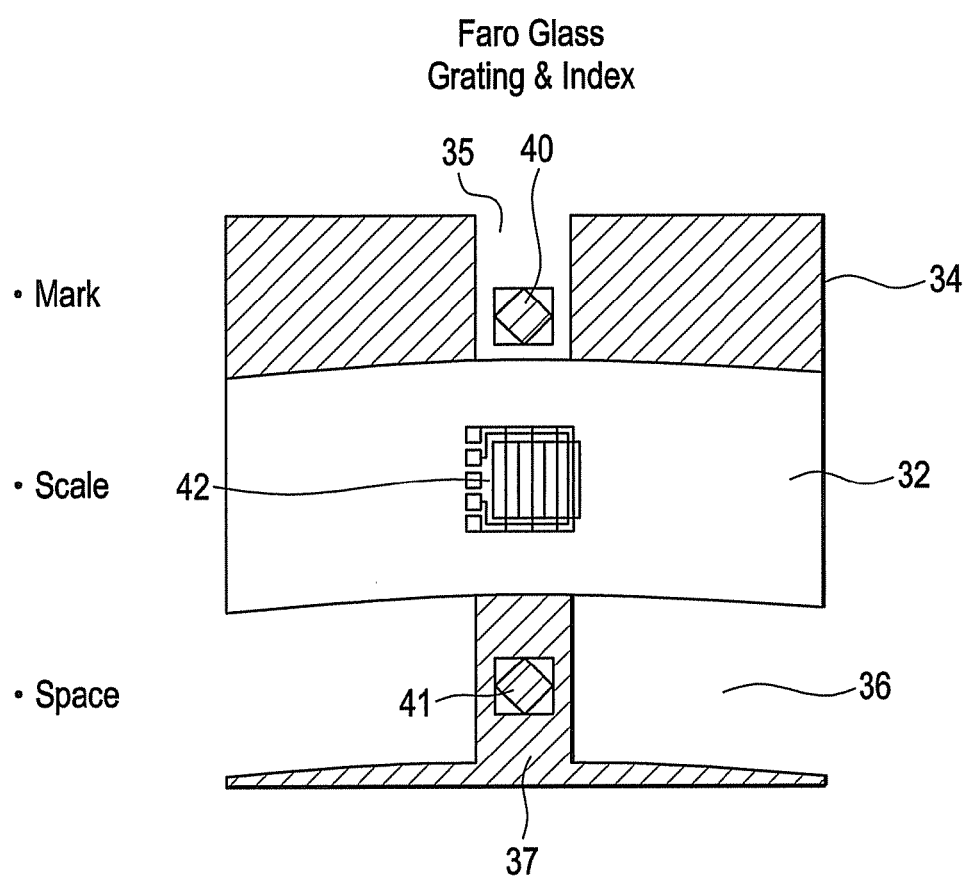

Direction of Travel (Dark Blue Mask Moves)
Mask Obstructs Light

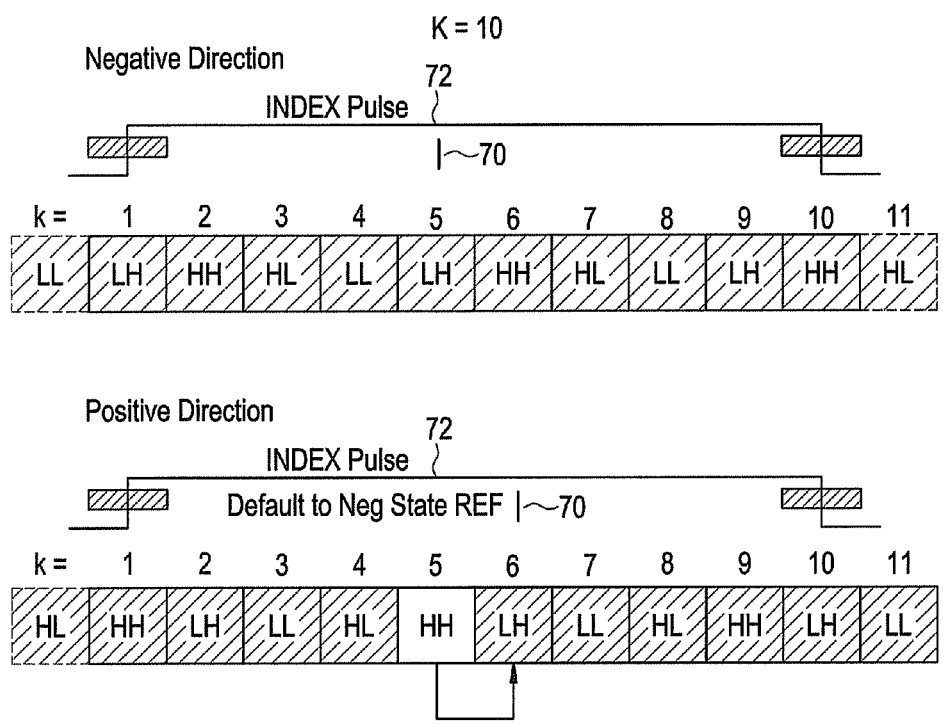

Index Signals, Mark and Space

"Blackened" Encoder Scales
Reflective or Front Side of Large and Small Encoder Scales Reflective or Front Side of Encoder Scale Non-Reflective or Reverse Side of Encoder Scale

400

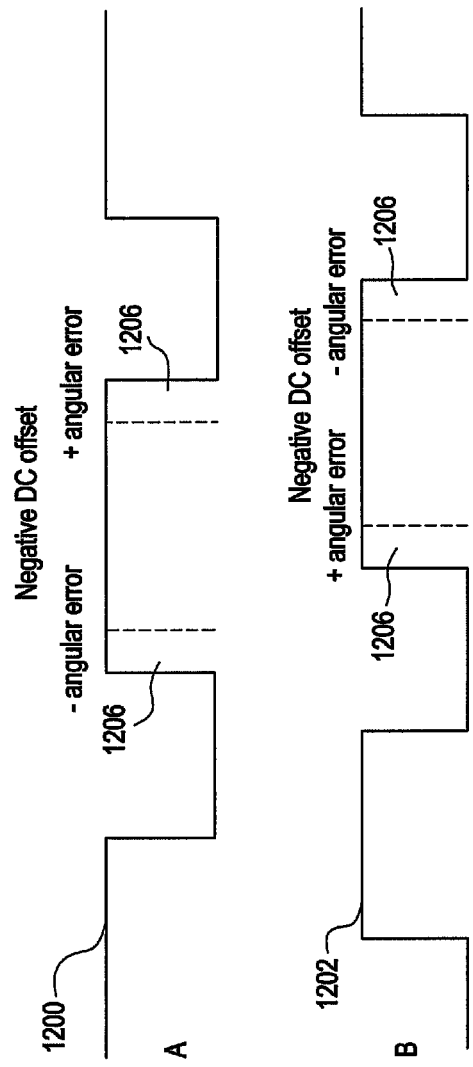

INDEXED OPTICAL ENCODER, METHOD FOR INDEXING AN OPTICAL ENCODER, AND METHOD FOR DYNAMICALLY ADJUSTING GAIN AND OFFSET IN AN OPTICAL ENCODER

CROSS REFERENCE TO RELATED APPLICATIONS

This application is a divisional of U.S. Nonprovisional application Ser. No. 12/549,731, filed Aug. 28, 2009, which claims priority to U.S. Provisional Application No. 61/092,478, filed Aug. 28, 2008; and U.S. Provisional Application No. 61/224,657, filed Jul. 10, 2009, the entire contents of each of which are incorporated herein by reference.

BACKGROUND

Many devices have been disclosed for measuring angular displacement. Typical devices often utilize detection of shifts in fringe patterns of diffracted light.

U.S. Pat. No. 5,355,220 to Kobayashi et al. discloses a light from a source radiated onto a diffraction grating to generate diffracted lights of different orders of diffraction permitting detection of light and dark stripes. Movement is measured by direct detection of movement of the stripes.

U.S. Pat. No. 5,486,923 to Mitchell et al. discloses a grating which concentrates light having a pre-selected wavelength into + and − first orders while minimizing the zero order. The diffracted orders of light illuminate a polyphase detector plate.

U.S. Pat. No. 5,559,600 to Mitchell et al. discloses a grating concentrating a pre-selected wavelength into positive and negative first orders. A polyphase periodic detector has its sensing plane spaced from the scale at a location where each detector element responds to the positive and negative first orders without requiring redirection of the diffracted light.

U.S. Pat. No. 5,909,283 to Eselun uses a point source of light directing a beam at an angle onto a movable scale. Diffraction beams are generated which are intersected by an optical component such as a Ronchi grating so as to form Moire fringe bands. An array of sets of photodetectors are positioned to intercept the bands of the Moire pattern and emit signals that are electronically processed to indicate displacement of the scale.

U.S. Pat. No. 7,002,137 to Thorburn discloses an optical encoder including a scale, the scale including an optical grating and an optical element; a sensor head, the sensor head including a light source and a detector array both of which are disposed on a substrate, the scale being disposed opposite the sensor head and being disposed for movement relative to the sensor head. A distance between the scale and a Talbot imaging plane closest to the scale being equal to d. The sensor head being disposed within a region bounded by a first plane and a second plane, the first plane being separated from the scale by a distance substantially equal to n times d plus d times x, the second plane being separated from the scale by a distance substantially equal to n times d minus d times x, n being an integer and x being less than or equal to one half. The light source emits a diverging beam of light, the diverging beam of light being directed towards the scale, light from the diverging beam of light being diffracted by the grating towards the detector array. A mask is disposed between the scale and the sensor head, the mask defining an aperture, the mask remaining substantially fixed relative to the sensor head, the aperture being sized and positioned to substantially prevent fifth order beams diffracted from the grating from reaching the detector array.

However, high accuracy is often a requirement for these devices, for example, micron range accuracy is often required. Many conventional devices have problems that limit their accuracy, reliability, calibration, and ease of mass production, and they are generally expensive when such fine resolution is required. The expense is due in part to the requirement to assemble these parts in precise locations relative to one another. Therefore, there is a need for highly accurate and reliable optical encoders that can be mass produced in an inexpensive manner.

SUMMARY

An embodiment of an optical encoder may include an encoder disk, an illumination system structured to direct light to the encoder disk, and a detector structured to detect light diffracted from the encoder disk. The encoder disk may include a signal track comprising a diffraction grating formed as a ring on the encoder disk and an index track comprising a reflective index mark, wherein a width of the index mark is larger than a pitch of the diffraction grating.

An embodiment of an encoder disk for use in an optical encoder may include a signal track comprising a diffraction grating formed as a ring on the encoder disk, and an index track comprising a reflective index mark, wherein a width of the index mark is larger than a pitch of the diffraction grating.

An embodiment of an indexing method for use with an optical encoder may include providing an encoder disk, providing an illumination system structured to direct light to the encoder disk, providing a detector structured to detect light diffracted from the encoder disk, calculating an estimated state count $k_{est}$ of quadrature states from a rising edge of the index pulse to a middle of the index interval, calculating $Q_{kest}$, wherein $Q_{kest}$ is the quadrature state at $k_{est}$ and corresponds to the quadrature state at an approximate center of the index pulse, and determining an offset correction. The encoder disk may include a signal track comprising a diffraction grating formed as a ring on the encoder disk, and an index track formed as a ring on the encoder disk, the index track comprising an index mark provided at an index angular coordinate. The detector may include two offset detectors structured to detect light diffracted from the signal track and output a quadrature signal, and an index detector structured to detect light reflected from the index track and output an index pulse.

An embodiment of a method of dynamically adjusting gain and offset in an optical encoder may include providing an encoder disk comprising a diffraction grating, illuminating the encoder disk with light, providing a detector structured to detect light diffracted from the diffraction grating and output a first fine count channel, calculating a first target gain and first target offset for the first fine count channel, and applying a correction to data sampled from the first fine count channel based on the first target gain and first target offset.

BRIEF DESCRIPTION OF THE FIGURES

Embodiments will now be described, by way of example only, with reference to the accompanying drawings which are meant to be exemplary, not limiting, and wherein like elements are numbered alike in several Figures, in which:

FIG. 7 is a diagram of a portion of an encoder disk and various detectors according to at least an embodiment.

FIG. 12A is a diagram to explain the indexing algorithm according to at least an embodiment.

FIG. 60 is a diagram showing the error in a quadrature state for a negative DC offset.

DETAILED DESCRIPTION OF THE PREFERRED EMBODIMENTS

Figure 1:
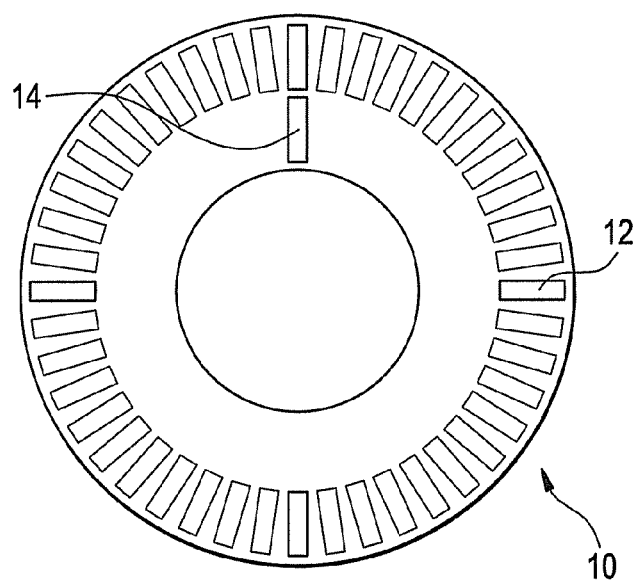
FIG. 1 is a diagram of an embodiment of an encoder disk.

As seen in FIG. 1, an encoder disk 10 can be formed by placing a track of lines, such as signal track 12, along the outer part of a circular piece of glass. When illuminated, the lines of the signal track 12 create an alternating light/dark pattern. The disk count refers to the number of light/dark pairs per disk revolution. Pitch refers to the distance between each mark or line of signal track 12.

Figure 2:
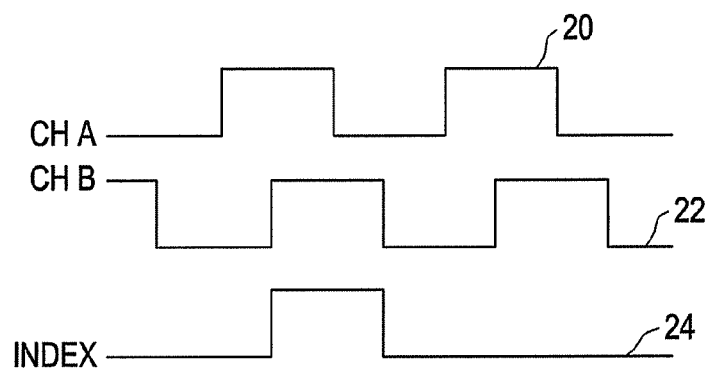
FIG. 2 is a diagram showing relative position of the dual quadrature signals and index signal according to at least an embodiment.

As seen in FIG. 2, when the lines are processed by offset detectors (¼ pitch offset) two outputs can be created which are commonly referred to as a quadrature signal pair, i.e. first quadrature signal (CH A) 20 and second quadrature signal (CH B) 22. It will also be understood that combined pair of signal 20 and signal 22 is commonly referred to as a quadrature signal, with it being understood that a quadrature signal includes a pair of phase-shifted signals.

As further seen in FIG. 1, a second mark is typically added to conventional encoder disk 12 to identify a specific (absolute) location on the disk. Index mark 14 is an example of such a mark.

Figure 3:
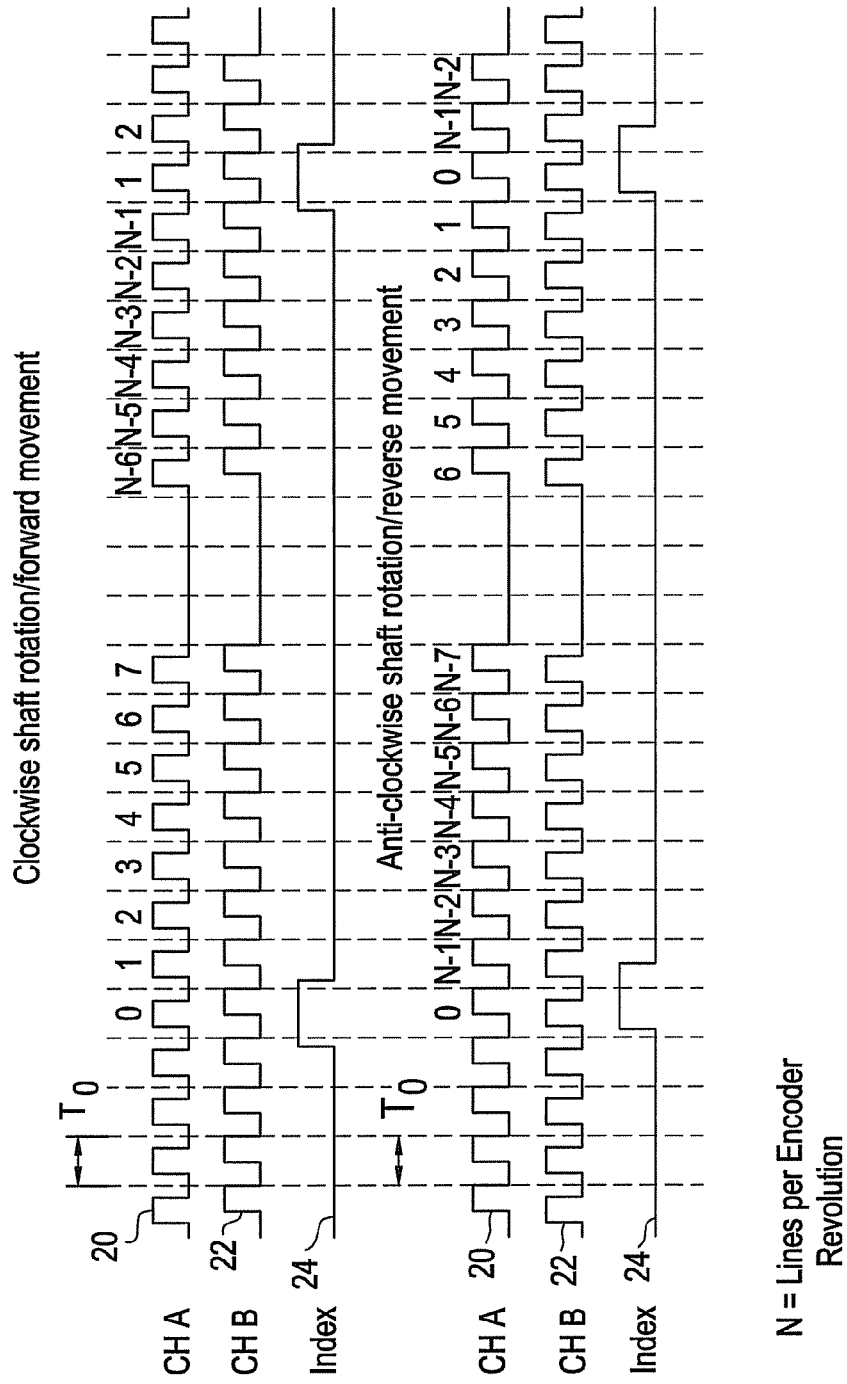
FIG. 3 is a diagram showing relative position of the dual quadrature signals and index signal according to at least an embodiment.

The quadrature relationship of CH A 20 and CH B 22 allows the direction and magnitude of rotation to be determined by an up/down counter, for example, or any other suitable means. Index mark 14 can provide a "zero" reference position. FIG. 3 shows an index signal 24 compared to first quadrature signal 20 and second quadrature signal 22.

Figure 4:
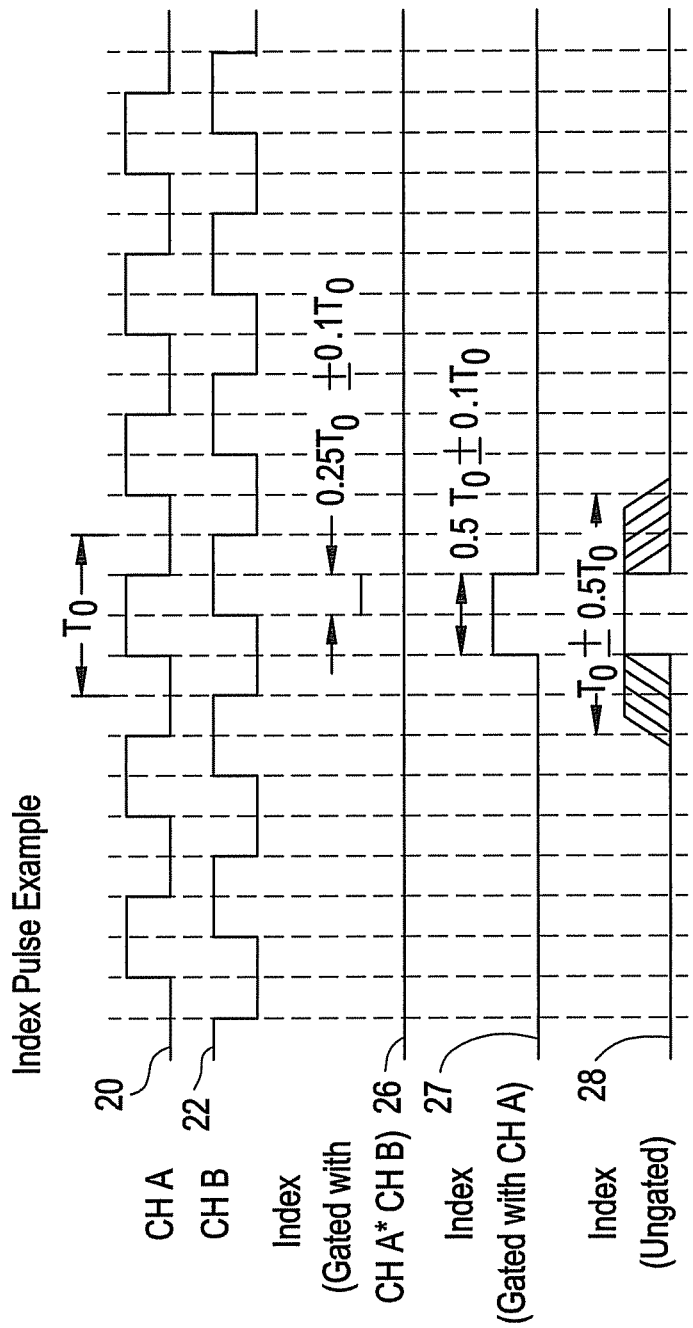
FIG. 4 is a diagram showing relative position of the dual quadrature signals and gated and ungated index signals according to at least an embodiment.

Quadrature encoders can come in two forms, gated or ungated. FIG. 4 shows examples of different index signals based on different types of gating. For example, gated index signal 26 is gated with the product of the first quadrature signal 20 and the second quadrature signal 22. Another example is gated index signal 27, which is gated with only the first quadrature signal. A third possible example is ungated index signal 28.

There are two methods for generating an index pulse. One uses reflection off a very narrow index mark or transmission through a narrow index slit followed by a photo detector. A comparator follows the conditioned detector signal and toggles when light intensity is above some threshold.

A second method uses diffraction. The index mark is made of a series of fine lines of varying pitch. Two or more photo detectors are placed at different locations dependant on diffraction order. The signals are added (or subtracted) and applied to a comparator. When signal levels are above some threshold an index pulse is generated. Both methods require critical alignment due to the small reflective or diffractive area.

Figure 5A:
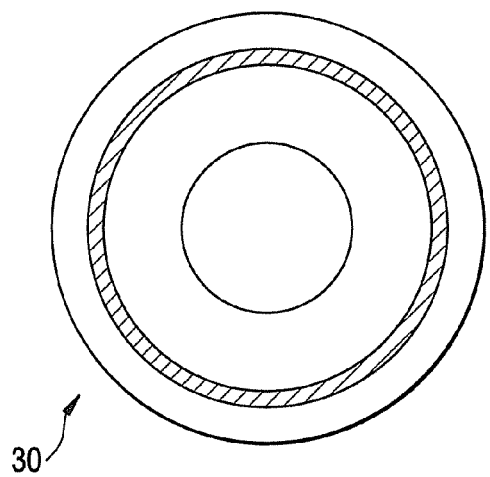
FIG. 5A is a diagram of an encoder disk according to at least an embodiment.
Figure 5B:
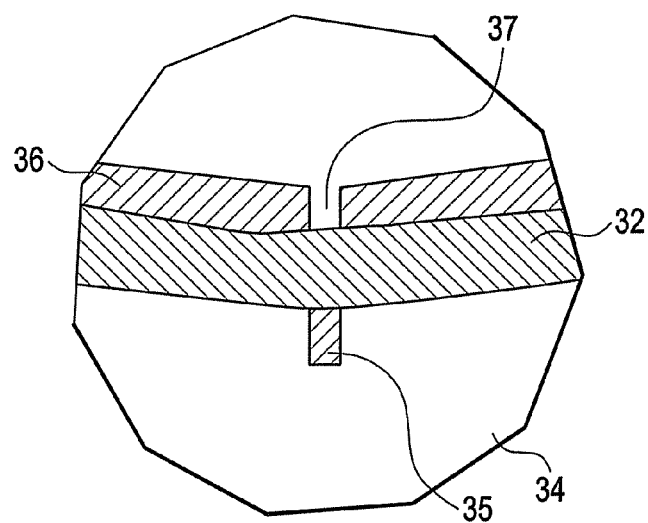
FIG. 5B is a magnified view of a portion of an encoder disk according to at least an embodiment.
Figure 6:
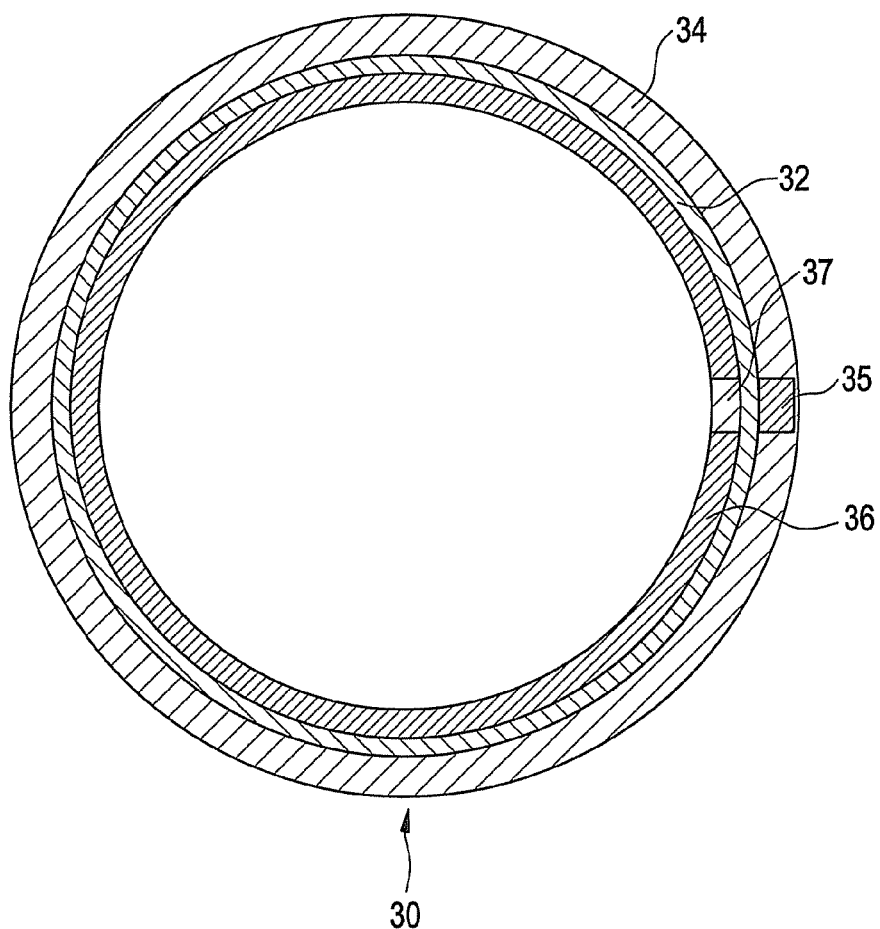
FIG. 6 is a diagram of an encoder disk according to at least an embodiment.

FIGS. 5A, 5B, and 6 show an embodiment of an encoder disk. For example, as seen in FIGS. 5B and 6, encoder disk 30 may include a signal track 32 that is a diffraction grating formed as a ring on encoder disk 30. The signal track may be formed by alternating reflective and non-reflective portions. For example, the non-reflective portions of the signal track may be formed by blackened or darkened glass, such as by painting with a flat black paint or other suitable method. It will be understood that the term non-reflective does not necessarily require a surface to have 0% reflectivity. For example, in at least some embodiments, a non-reflective surface can have a low reflectivity, such as a reflectivity of 5% or another suitable value.

Figure 41:
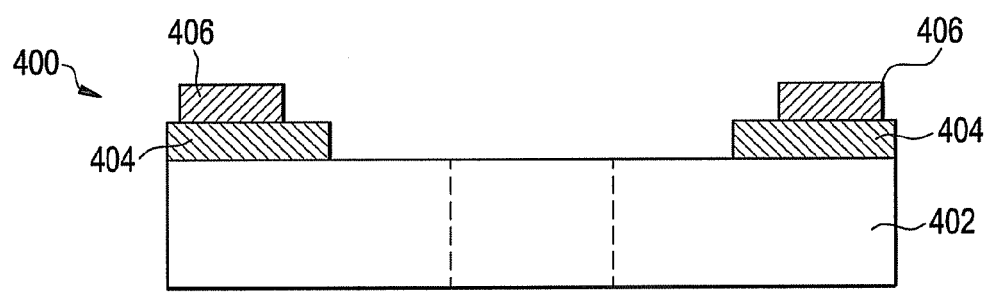
FIGS. 41-42 are views of a two chrome layer encoder disk.
Figure 42:
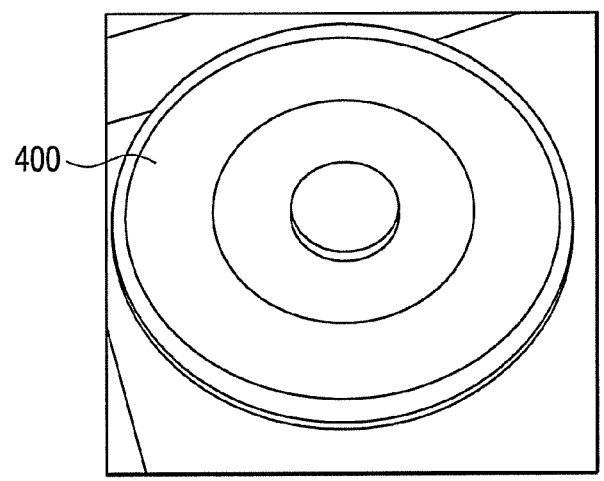

As one possible alternative, the reflective and non-reflective portions can be implemented using two layers of chrome, with one layer being absorbent and the other being reflective. FIGS. 41 and 42 illustrate an embodiment of an encoder disk 400 using two layers of chrome. FIG. 41 shows an encoder disk 400 having a substrate 402, a low reflective chrome layer 404, and a high reflective chrome layer 406. High reflective chrome layer 406 is deposited on low reflective chrome layer 404. High reflective chrome layer 406 may be formed in a pattern such that a portion of a portion of low reflective 404 remains visible after high reflective chrome layer 406 is applied. For example, high reflective chrome layer 406 may be formed in a pattern to form a signal track and index tracks on the encoder disk.

The low reflective chrome layer 404 may be made of chrome oxide or another suitable material for example, and may have a reflectivity of 5% on the air side in at least one embodiment. Additionally, in at least one embodiment, the high reflective chrome layer may have a reflectivity of 65% on the air side and 59% on the glass side. The performance of encoders having two chrome layers will be discussed further herein.

Encoder disk 30 may also include an outer index track 34 that is positioned outside signal track 34 in a radial direction, i.e., towards the outer edge of encoder disk 30. In the embodiment shown in FIGS. 5B and 6, outer index track 34 is non-reflective except for a reflective outer index mark 35 positioned at an index angular coordinate of the encoder disk. The index angular coordinate can be an arbitrary "zero" reference point in the circumferential direction.

Encoder disk 30 can also include an inner index track 36 formed as a ring on encoder disk 30. Inner index track can be formed inside the signal track in a radial direction, i.e., closer to the center of encoder disk 30. In the embodiment shown in FIGS. 5B and 6, inner index track is reflective except for a non-reflective inner index mark 37 positioned at the same index angular coordinate as reflective outer index mark 35.

Figure 8A:
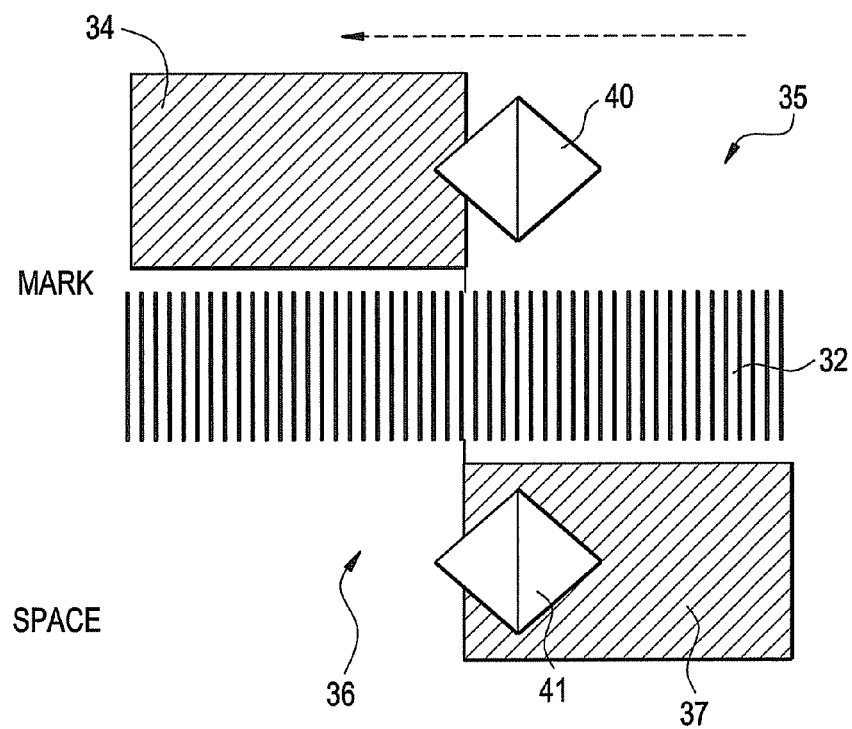
FIG. 8A is a diagram showing the relative position of index tracks and detector according to at least an embodiment.

As can be seen in FIGS. 7 and 8A, in at least an embodiment a width of the index mark is larger than the pitch of the diffraction grating.

While the embodiments of FIGS. 5B and 6 show a non-reflective outer index track 34 with a reflective outer index mark 35 and a reflective inner index track 36 with a non-reflective inner index mark 37, it will be understood that the reflective and non-reflective portions can be exchanged and still achieve the exact same results. For example, it is possible to have a reflective outer index track with a non-reflective outer index mark and a non-reflective inner index track with a reflective outer index mark.

The reflective and non-reflective portions of the index tracks can be implemented in a variety of ways. For example, similar to the signal track, non-reflective portions of the index track can be formed by darkening the glass of the encoder disk.

Figure 51:
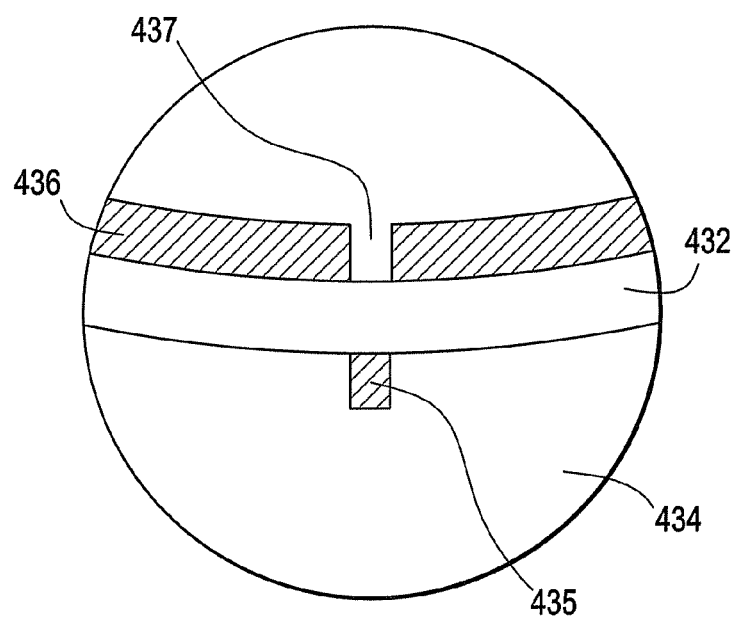
Figure 52:
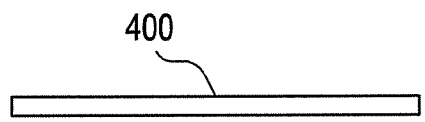
Figure 53:
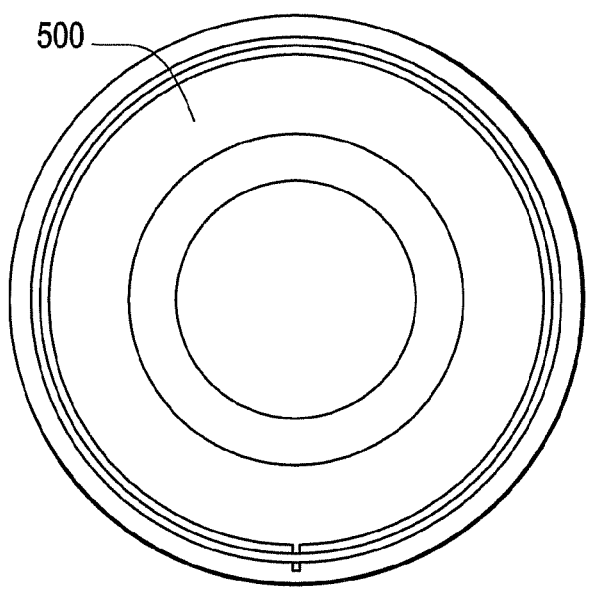
Figure 54:
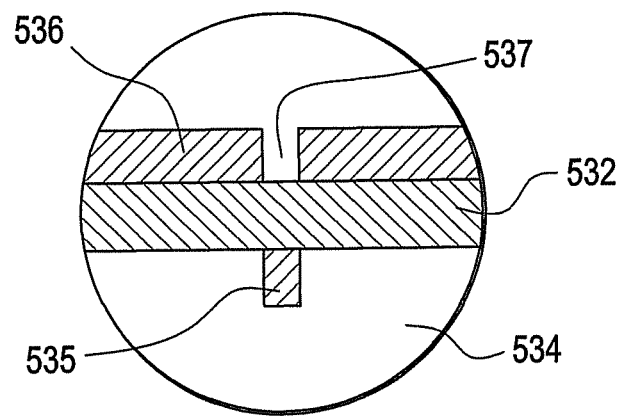
Figure 55:

Alternatively, as noted above, absorbent and reflective chrome layers can also be used. FIGS. 50-55 illustrate specific possible embodiments of encoder disks 400, 500 having two chrome layers. As seen in FIGS. 51 and 54, encoder disks 400, 500 are structured similarly to the encoder disk described above, and may include an outer index track 434, 534; an outer index mark 435, 535; inner index track 436, 536; and inner index mark 437, 537. Similar to the encoder disk 30 described above, the reflective and non-reflective portions of encoder disks 400, 500 can be exchanged and are not limited to one specific arrangement. Additionally, it will be understood that the dimensions indicated in the specific drawings refer to the specific embodiments shown, and do not limit the scope of the invention in any way.

Photodetectors can be used to monitor each index track and the signal track. As seen in FIG. 7, detectors 40, 41 can be used to detect the outer and inner index tracks, and signal track detector 42 can be used to detect the light diffracted from the signal track. Since the index patterns are the opposite of each other (i.e., one index track is reflective at index angular coordinate and the other index track is non-reflective at the index angular coordinate), then the index outputs from detectors 40, 41 will be inverted about a common offset level.

For example, FIG. 8A shows a view focused on the region of the index angular coordinate. In FIG. 8A, the dark region (i.e., 34, 37) is non-reflective and is moving to the left. The light region (i.e., 35, 36) is reflective and is also moving left to right. Detectors 40, 41 are shown superimposed over the index tracks. FIG. 8A uses the same configuration of reflective and non-reflective portions as seen in FIGS. 5B and 6.

Figure 8B:
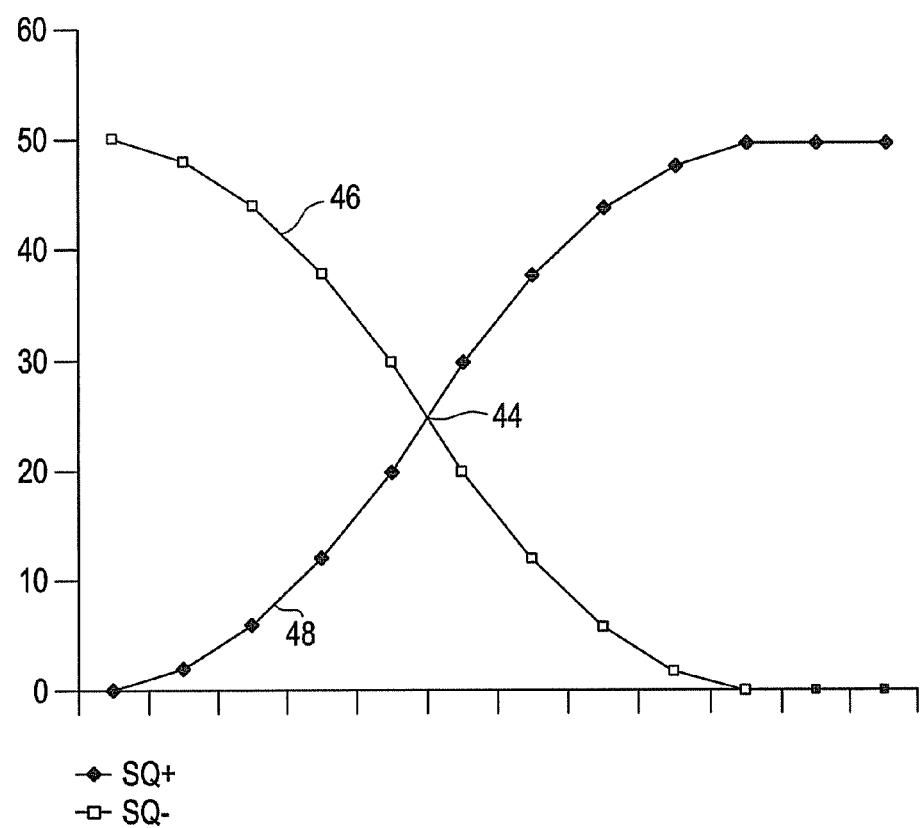
FIG. 8B is a graph showing signals generated by the index tracks according to at least an embodiment.

FIG. 8B shows the output of the inner index signal 46 and the outer index signal 48 as a function of time. For example, the left of the graph represents a period in time when the index angular coordinate is far from the detectors 40, 41. At this point, the inner index track is reflective at detector 41, and thus inner index signal 46 is high to the left of the graph in FIG. 8B. Also at this time, the outer index track is non-reflective at detector 40, and thus outer index signal 48 is low to the left of the graph in FIG. 8B.

As time progresses and the encoder disk rotates in FIG. 8A, the region seen by detector 40 transitions from non-reflective to reflective, and the region seen by detector 41 transitions from reflective to non-reflective. This transition is reflected in FIG. 8B by the inner index signal 46 going from high to low, and the outer index signal 47 going from low to high. An intersection of inner index signal 46 and outer index signal 47 can indicate the "start" or "end" of the index mark on the encoder disk.

Figure 9:
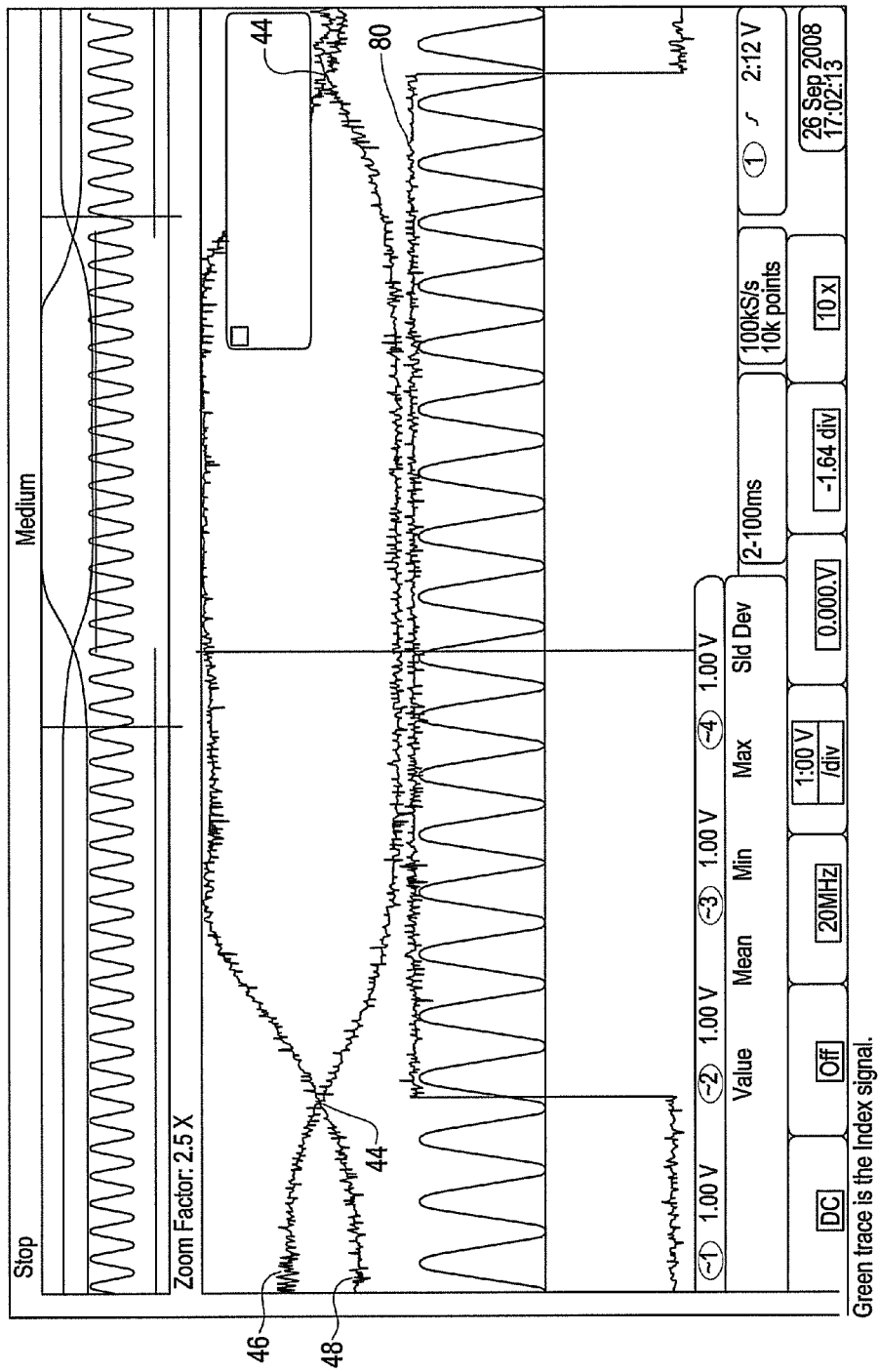
FIG. 9 is a graph showing various signals according to at least an embodiment.

FIG. 9 indicates one example of a display showing index pulse and signal track traces. For example, index pulse 80 of FIG. 9 represents the index mark. FIG. 9 further shows that the rise and fall of index pulse 80 corresponds to intersections 44 of inner index signal 46 and outer index signal 48.

Figure 10:
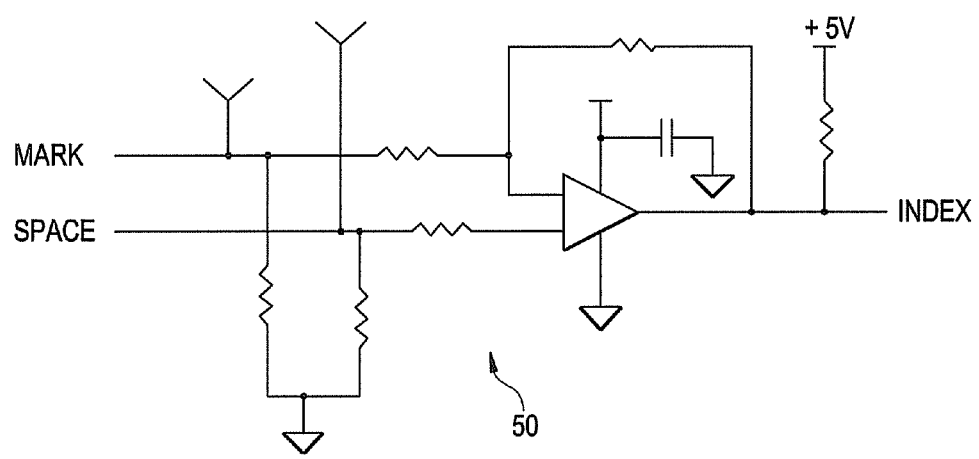
FIG. 10 is a diagram of a comparator according to at least an embodiment.

FIG. 10 shows one example of a comparator for converting an inner index signal and an outer index signal into a logical index signal. For example, the logical index signal will transition high or low based on the intersections of the inner index signal and outer index signal.

As discussed above, a diffraction grating signal track can produce dual quadrature signals such as CH A 20 and CH B 22. These signals can be created by using a detector 42 that includes offset detectors, for example. The magnitude and direction of rotation can be determined by analyzing the dual quadrature signals, for example through an up/down counter. Once indexed, an absolute position can also be determined from the up/down counter.

Figure 11:
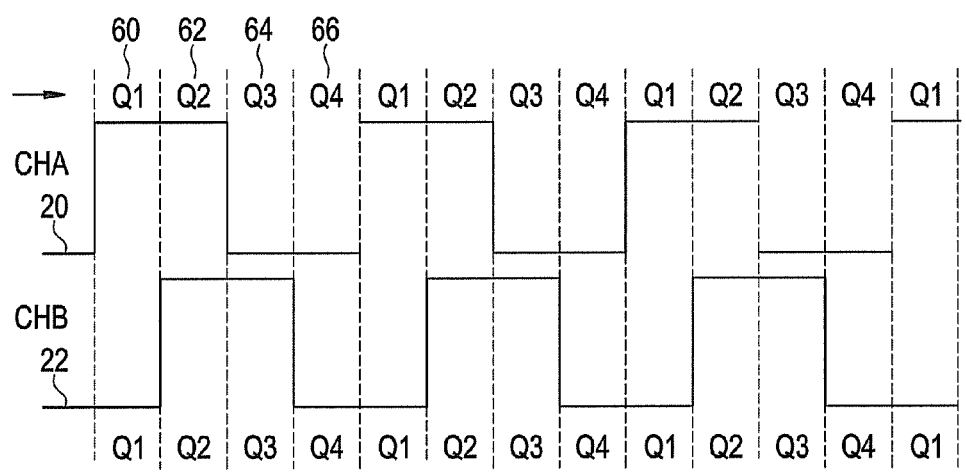
FIG. 11 is a diagram showing the different quadrature states according to at least an embodiment.

As shown in FIG. 11, there are four possible quadrature states 60, 62, 64, 66. The following table summarizes the possible quadrature states of CH A 20 and CH B 22:

|  | CH A (20) | CH B (22) |
| --- | --- | --- |
| Q1 (60) | High | Low |
| Q2 (62) | High | High |
| Q3 (64) | Low | High |
| Q4 (66) | Low | Low |

In other words, the quadrature states represent a Gray Code sequence. Entry into a different quadrature state from a previous (different) state will either increment or decrement the position counter based on direction.

In an indexing operation, several quadrature states will be present during the index period. In other words, the index marks on the index tracks can be large enough such that progressing through the index track progresses through several quadrature states.

Figure 12B:
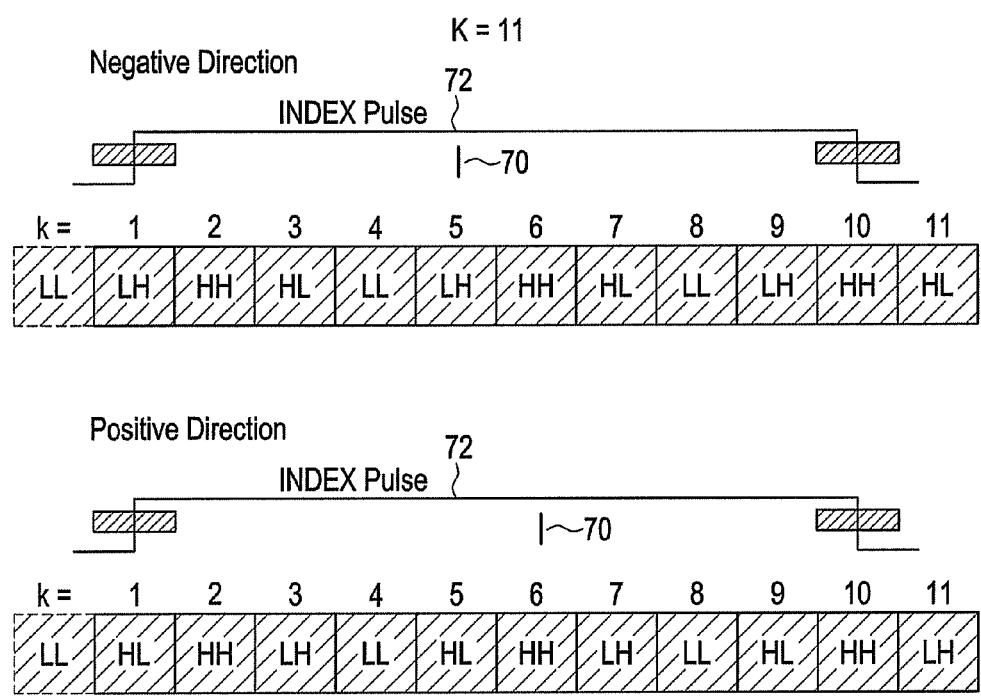
FIG. 12B is a diagram to explain the indexing algorithm according to at least an embodiment.

For example, let K be the number of quadrature states. The optimum target index state is the quadrature state closest to the center of the index pulse 72 or index interval. In a given direction (+/−, CCW/CW) the optimum target state is K/2 (for even K) or (K+1)/2 (for odd K). In FIG. 12A, for example, K=10, and the optimum target state 70 is positioned at quadrature state 5. Note that the "optimum" state is identical for CW and CCW rotations when K is odd and different by one quadrature state when K is even (see FIG. 12B, for example). This situation is discussed in more detail below.

By selecting a target state as close as possible to the middle of the index interval 72 (and compensating for an even count) it can be shown that the selected state can be found consistently and without error no matter which direction of rotation is used. Further it is unaffected by a change in the width of index interval 72.

The index interval 72 can either shift asymmetrically (i.e., in one direction) or symmetrically (i.e., expansion or contraction about the index center point). By superposition one can have a combination of the two, but errors can be accounted for by examining the asymmetrical and symmetrical characteristics individually. Further, application of hysteresis to the trailing edge of the index pulse 72 will reduce the ambiguity to one quadrature state.

Asymmetrical Error:

There are two sources for asymmetrical error. The first is due to a shift in read head position, and the second source is due to the ambiguity (caused by noise and delay) which provides a simultaneous change of quadrature state and an index pulse transition.

The first need not be considered. A moving read head makes a precision encoder unrealizable. This must be eliminated by design.

The second asymmetrical error source has two components. If a single edge occurs, a ½ count error (½ quadrature state) is realized. The second component, which results in a worst case condition, exists if a transition ambiguity occurs at both ends and in the same direction (Different direction would constitute a symmetrical shift). However, when considering travel in both CCW and CW directions this may translate to a two count (or quadrature state) difference between both estimates. This is undesirable as there is an ambiguity of which state is correct. Hysteresis provides a solution to this source of error.

The addition of ½ quadrature state of hysteresis applied at the end of the index (true for both directions) removes a two edge ambiguity and reduces the difference between CCW and CW estimates to 1 count (quadrature) state. See FIGS. 13A, 13B and 13C. In essence the estimates are brought closer together.

Therefore at most there can be only one count or one quadrature state difference between the "target" and newly computed target estimate. A test of quadrature state will reveal the true target's location.

Symmetrical Error

As the index interval expands or contracts there is no additional error introduced. During the movement only a single count asymmetrical error can occur as noted above. A target selection strategy of choosing one state for both CCW/CW motion will be used when correcting for EVEN count intervals.

Error Correction:

As noted above, at most only one count/state error will be found between the state established from K/2 or (K+1)/2 and a subsequent evaluation. Knowing the target offset direction (selected state) arrived at during calibration allows us to produce a correction factor to be added to the target count to produce the offset (difference between the actual count and desired count (0) at the index target). The offset is subtracted from the current count to provide the absolute index position.

Figure 14:
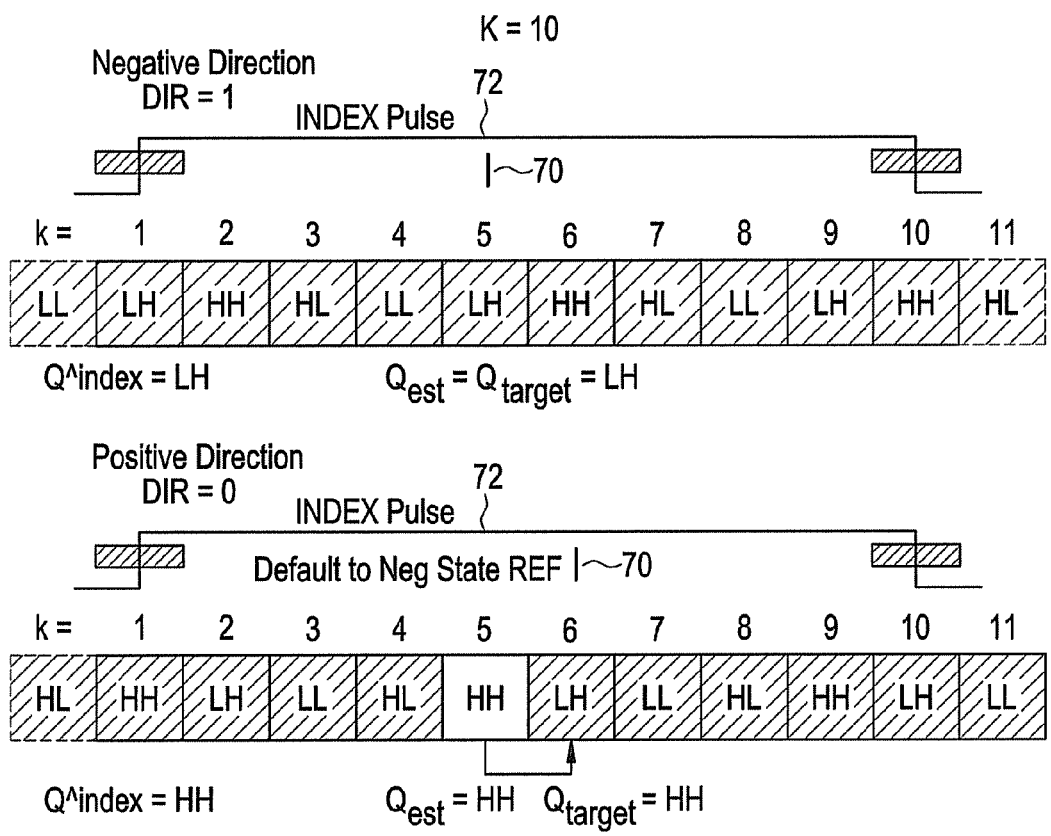
FIG. 14 is a diagram to explain the indexing algorithm according to at least an embodiment.

The following definitions are used in explaining the error correction algorithm and refer to FIG. 14.

P_Count$_i$=Value of position counter at location i.

P_Count$_{index}$ is the position count at the rising edge of index pulse.

K=Quadrature count from the beginning to the end of the index pulse. This is always positive (i.e. independent of direction)

Dir=0 (P_Count increments in this direction) or 1 (P_Count decrements in this direction). It is a flag noting the direction of rotary motion through an index sequence. Example Dir=0 for CCW and 1 for CW.

k$_{est}$=Estimate of the number of quadrature states from the index rising edge to the target state.

It is the state count from the rising edge of index pulse to the middle of the index interval.

k$_{target}$=The actual state count from the rising edge of index pulse to the target state.

$Q_i$=Quadrature state (Gray Code) at location i.

$Q_{target}$=Gray code at the target state for index reference.

It is assumed below that ½ state hysteresis is employed. Given a target state ($Q_{target}$), the reference point can be established from four variables. The way in which these variables are used to adjust the reference point is referred to as the Index Algorithm.

If no target state has been defined then the Index Algorithm must be run in both directions. The outputs from each pass are evaluated and a $Q_{target}$ selected. This is described later.

This implies that a Target Valid (TV) flag exists. For now we will assume that TV=0 for no $Q_{target}$ defined and TV=1 when it has been.

The following variables are used in the Index Algorithm:
1. Position counter value at the start of index (rising edge of index pulse).
2. Direction of rotation. (Is the position counter incrementing or decrementing through the index interval?).
3. Gray code of the quadrature state at start of index.
4. Total number of quadrature states in the index interval.

For TV=0

$Q_{target}$ is established by running the Indexer Algorithm in both directions. The Algorithm outputs ($Q_{kest+}$ and $Q_{kest-}$) from each direction are compared. If equal then that becomes the target state. If they differ by one state then we always let $Q_{kest}=Q_{kest-}$ (reverse is also acceptable). A consistent approach is best. If $Q_{kest+}$ and $Q_{kest-}$ differ by more than 1 state then a hardware fault exists.

For TV=1

The algorithm calculates $k_{target}$ (number of states from index start to target state ($Q_{target}$)). Note that $Q_{target}$ is the best state (closest to the center of the index interval).

Once $k_{target}$ is determined the reference calculation (Zero Position) is calculated as follows (Refer to Definitions section which follows):

For a Positive Direction—

$$P\_Count_{new}=P\_Count_{current}-[P\_Count_{index}+(k_{target}-1)]. \qquad EQ\ 1.$$

Note that the adjustment to $k_{target}$ (−1 term) is because the k counter starts at 1 upon the index start event.

For a Negative Direction—

$$P\_Count_{new}=P\_Count_{current}-[P\_Count_{index}-(k_{target}-1)]. \qquad EQ\ 2.$$

Note that the adjustment to $k_{target}$ (−1 term) is because the k counter starts at 1 upon the index start event. This is the same as in the positive rotation case.

Phases:

Cal_Phase—Both CCW and CW directions are used to determine target index state.

FACTORY Setting. Indexing Algorithm used.

Index_Phase$_{dir}$—Find reference point. Indexing Algorithm used.

Zero_Phase—Calculation and application of correction such that P_Count$_{target}$=0 (target location).

Enter absolute encoder mode.

Indexing Algorithm:

The purpose is to find the index reference point for either a Positive (CCW) or Negative (CW) encoder rotation.

| Input: | $Q_{target}$ and TV |
|---|---|
| Output: | $k_{target}$ |
| Variables: | P_Count^$_{index}$, Q^$_{index}$, K, and Dir. |

Step 1

Determine $k_{est}$ $$k_{est}=K/2\ (\text{for } K\ \text{even}) \text{ or } (K+1)/2\ (\text{for } K\ \text{odd}). \qquad EQ\ 3.$$

We will identify the quadrature states starting with the rising edge of the index pulse as follows (this forms a modulo 4 pattern):

$Q_1, Q_2, Q_3, Q_4, Q_5, Q_6, Q_7, Q_8, Q_9, Q_{10}, Q_{11}, Q_{12}$ $Q_1, Q_2, Q_3, Q_0, Q_1, Q_2, Q_3, Q_0, Q_1, Q_2, Q_3, Q_0, \ldots$ (congruence)

Where $Q_{index}=Q1$

Step 2

Determine $Q_{kest}$

The quadrature state at $k_{est}$ ($Q_{kest}$) can be found from:

$$Qkest=Q\{kest \bmod 4\} \qquad EQ\ 4.$$

Note: Modulo arithmetic.

0 mod 4=0
1 mod 4=1
2 mod 4=2
3 mod 4=3
4 mod 4=0
5 mod 4=1
6 mod 4=2

Determine Qkest (Continued)

If $k_{est}$ mod 4=1 (e.g. $k_{est}$=5 or 9 or 13 ... ) then $Q_{kest}=Q_1$. (See also FIGS. 12 A, 12B, 13A, 13B and 13C).

The Q's are assigned by direction and the second element (See Clarification Note) is addressed by the Index rising edge. The table generated is named the Offset Table. Moving down the Table is positive (increasing counts), up is negative. This is independent of the direction of rotation.

Example 1

Figure 13A:
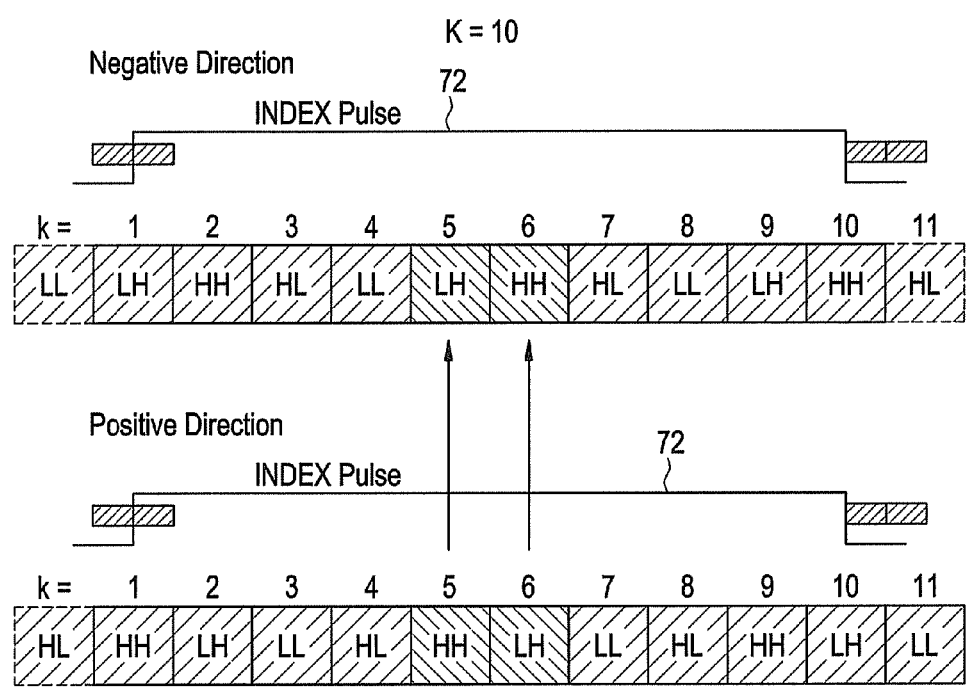
FIG. 13A is a diagram to explain the indexing algorithm according to at least an embodiment.
Figure 13B:
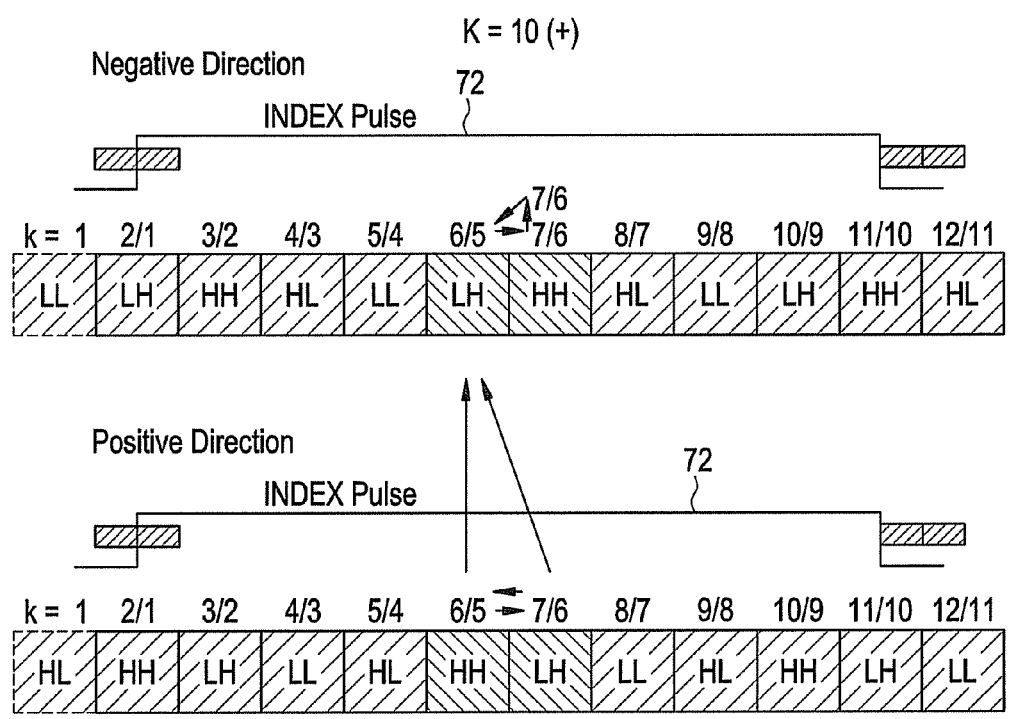
FIG. 13B is a diagram to explain the indexing algorithm according to at least an embodiment.
Figure 13C:
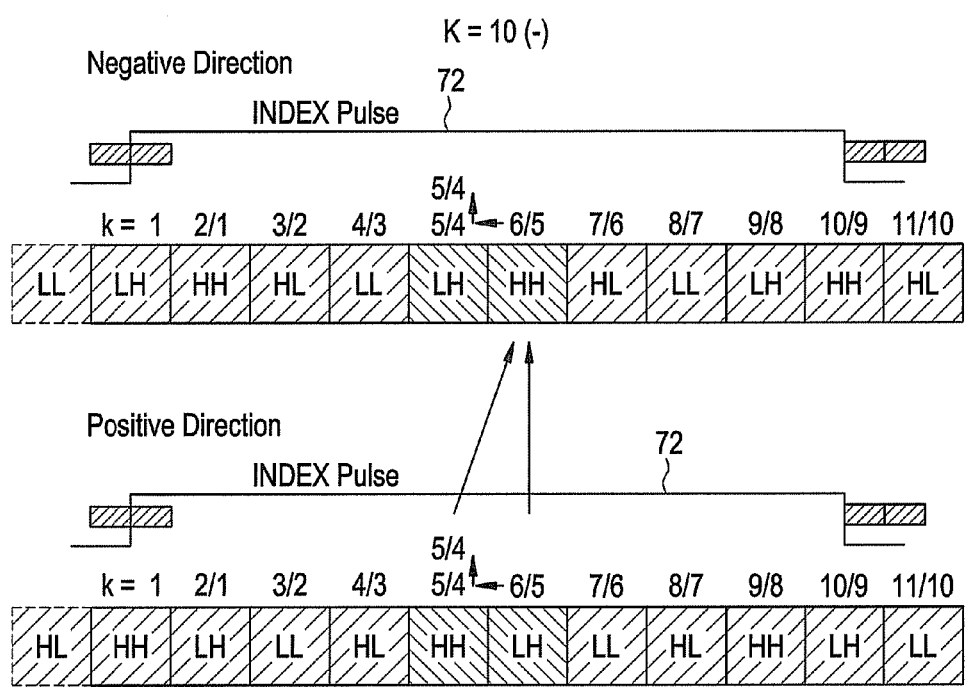
FIG. 13C is a diagram to explain the indexing algorithm according to at least an embodiment.

Use FIG. 13A

TABLE 1

(Example Offset Table)

For negative direction Q1 = LH
$Q_3$ = HL [nearest HL to $Q_0$]
$Q_0$ = LL
$Q_1$ = LH (Index start) always at "remainder = 1" state.
$Q_2$ = HH
$Q_3$ = HL
$Q_0$ = LL [nearest LL to $Q_3$]

K=10 or 11 depending on whether you end in the red or blue interval. We will examine each.

If K=11 then $k_{est}$=(11+1)/2=6. 6 mod 4=2

So $Q_6$=HH=$Q_2$ or next state from $Q_1$ in the forward direction. Dir selects the table (actual sequence). We always move forward or back within a selected table in the same fashion whether the motion is positive or negative.

Note: As we have no referenced P_Count it cannot be used directly to deduce the Gray Code.

Clarification Note for Offset Tables

Bold text indicates x mod 4 result. If the result is at the boundary ($Q_0$ or $Q_3$) the table must extended by one state (Italicized, back (if @ $Q_0$)/forward (if @ Q3)—here both possibilities are shown). The search is always conducted to the nearest neighbor.

Assume The Index occurs at an arbitrary State ($Q_1=Q_C$). If kest mod 4→$Q_0(Q_B)$, and the target state is $Q_A$ then

TABLE 2

(Offset Table with extension)

$Q_3 = Q_A$ [nearest $Q_A$ to $Q_0$] [If required]
$Q_0 = Q_B$ ---------
$Q_1 = Q_C$ (Index start) always at "remainder = 1" state.
$Q_2 = Q_D$
$Q_3 = Q_A$
$Q_0 = Q_B$ [nearest $Q_B$ to $Q_3$] [If required]
Offset = −1.

Step 3
Determine Offset Correction
If TV=0, $Q_{kest}$ from both directions is required. There is no equivalence to $Q_{target}$ to test.
Raw data is used to make a target decision. K's from each pass should be checked. $|K_+-K_-|<=2$
If TV=1, $Q_{target}$ has been defined.
When $Q_{target}$=Qkest., $k_{target}$=$k_{est}$.

Otherwise we need to correct by one state count (up or down). If there is more than one state difference, a fault has occurred.

$$k_{target}=k_{est}+\text{Offset. Where Offset}=+1 \text{ or } -1. \quad \text{EQ 5.}$$

Determine Offset Correction (Continued)

Example 2

Use FIG. 13A

TABLE 1

(repeated)

$Q_{target}$ = LH = Q1 in Offset Table (Table 1)
$Q_0$ = LL
$Q_1$ = LH (Index start) always at "remainder = 1" state.
$Q_2$ = HH ---------
$Q_3$ = HL
With K = 11, $k_{est}$ = 6 and $Q_{kest}$ = HH = Q2
Using EQ 5.
Offset = $k_{target} - k_{est}$ = −1 (move up the Offset Table from estimate to target)

Therefore, $k_{target}$=6−1=5

The structure and methods described above have a number of significant advantages. For example, optical alignment becomes very simple. No precision gratings on the encoder scale or placement of the read head is required. Additionally, the gap width (i.e., width of the index mark) is large compared to conventional devices. Therefore, tolerance in gap position can be larger than in conventional encoders. Thus, overall, the structure and methods described above can result in an encoder that is cheaper and simpler to manufacture and implement compared to conventional encoders.

Additionally, there is an improved design margin for multiple read heads. Two and four read heads are common for very high precision encoders. Conventional index methods, gated or un-gated must be applied to all read heads simultaneously. Given the fact that the read heads can never be exactly at 180 deg (2-read head) or 90 deg (4-read head) from each other there will be differences between read head positions within the index pulse. Picking a best state is more difficult since the middle is skewed for each read head. In contrast, in one embodiment of the structure described above, the encoder uses a wide Index (320 micron arc length, 64 quadrature states), so this is of little concern. Differences are minimized with respect to temperature drift and ageing as well.

Also, in a conventional encoder, if the index pulse contains 5 or more quadrature states it is possible to pick a redundant state. This has to be tested for and corrected (usually by hardware, e.g. by cable swap). The structure and technique described above is by design unaffected with this kind of redundant states.

Additionally, the techniques and structures described above can be used with multi-mode (i.e., non-Gaussian) as well as single mode (i.e., Gaussian) laser diodes. The apparatus is insensitive to beam profiles. An LED can also be used as a possible light source in place of the VCSEL. This flexibility in light sources helps to minimize cost. Multi-mode VCSELS and LEDs can be less expensive and more reliable than single mode diodes, as are simple grating patterns.

It is also noted that unwanted reflections from the encoder disk can be reduced by applying an optical black (i.e., light absorbent compound) to the rear surface of the encoder scale. The optical black compound can also be applied to the front of the encoder scale in an alternative embodiment. Additionally, the low reflective and high reflective layers described above can also reduce unwanted reflections.

For example, the method and structure described above uses two complementary (i.e., Boolean interpretation) reflective tracks that are on opposite sides of the quadrature signal grating. Since the index method relies on two reflective paths on each side of the laser beam they must be in line with their respective photo-detectors (2) and each receive sufficient energy for signal crossover.

If the dark level of each index signal is the same then crossover at the index interval is guaranteed as long as the individual signals are larger than the peak to peak noise level plus hysteresis.

Figure 15:
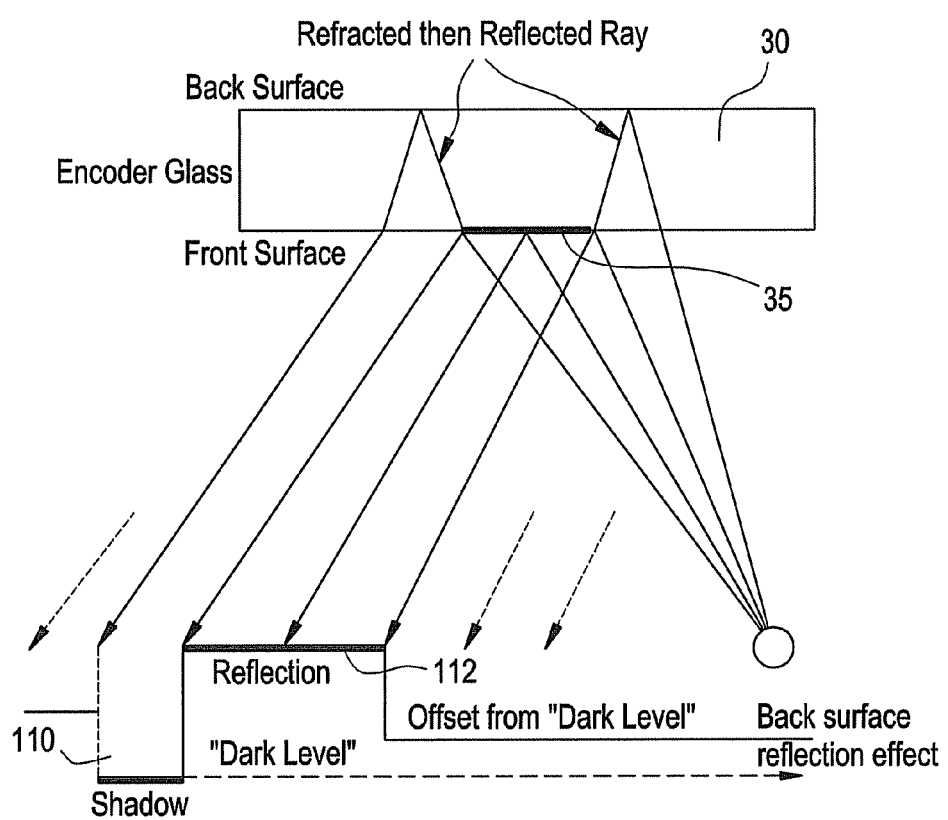
FIG. 15 is a diagram to show light reflection off the encoder disk according to at least an embodiment.
Figure 16:
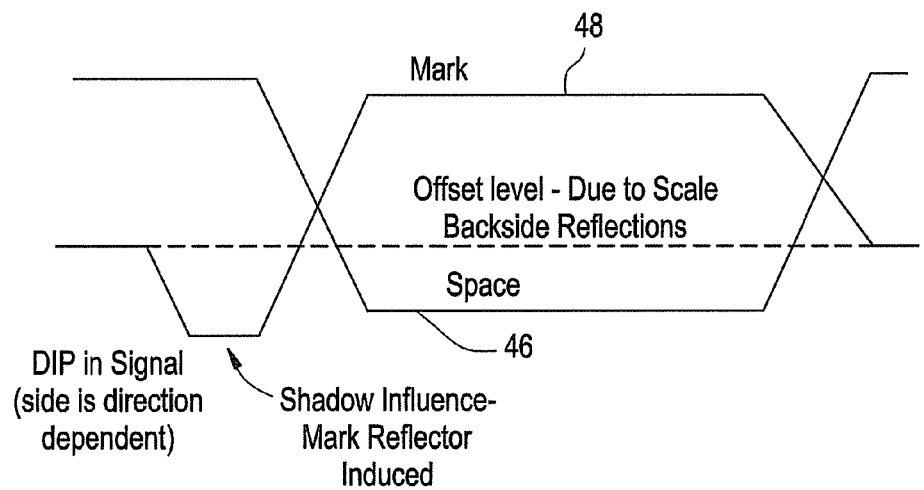
FIG. 16 is a chart showing the effect of light reflection on the index signals according to at least an embodiment.

It is possible for the Mark channel signal 48 (i.e., the signal caused by the reflective outer index mark) of the Index signal pair to have a DC offset in some cases. In other words, the Mark signal 48 did not match the Space signal's 46 (i.e., non-reflective inner index mark) lowest level. Because a dip 110 in this DC offset just before the reflection 112 was detected (See FIGS. 15 and 16), it was suspected that a reflection from the back surface of the encoder scale was the culprit. Dip 110 is due to a reflection from the back of the encoder scale which is reduced as the Mark reflector comes into view.

When the backside of the scale is painted with an optical black or flat black paint (see FIGS. 17, 18 for the front side of an encoder disk, and FIG. 19 for the back side painted black) the offset disappears. Due to the wide illumination and processing area used by the structure described above, the device is more susceptible to unwanted reflections than are conventional devices. Blacking all surfaces within the assembly in which the encoder disk is used further improved the quality of the Lissajous signals (the inputs of the Lissajous being the two channels of the quadrature signal). Note that this technique was tried on conventional devices as well and the Lissajous distortions improved (improved circle quality) as well. This points to the fact that reflections are the main source of Lissajous distortions such as elliptical shape, noisy circles and irregular circles (e.g. potato shape).

It thus appears that all designs benefit from reduced reflections. An optical absorption material applied to the back (or front, outside the grating or Index reflectors), or low reflective and high reflective layers, can improve read head performance. For example, signal to noise ratio for the index signal can be improved, and better quadrature signals can be obtained because of reduced specular reflections.

It will also be understood that the absorptive coating or low reflective and high reflective layers can be optimized for the particular wavelength of light being emitted by the illumination system.

Figure 17:
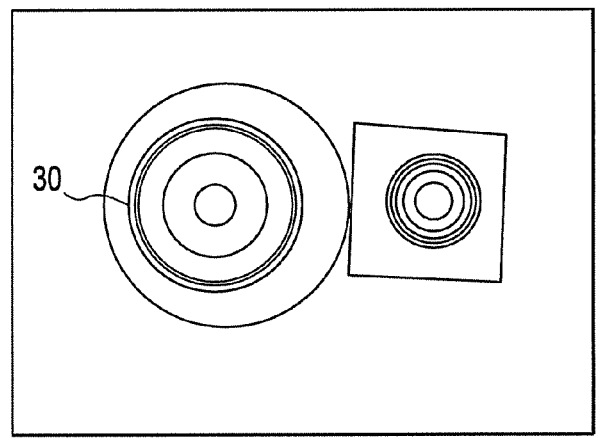
FIG. 17 is a photograph of the front of an encoder disk with one side painted black according to at least an embodiment.
Figure 18:
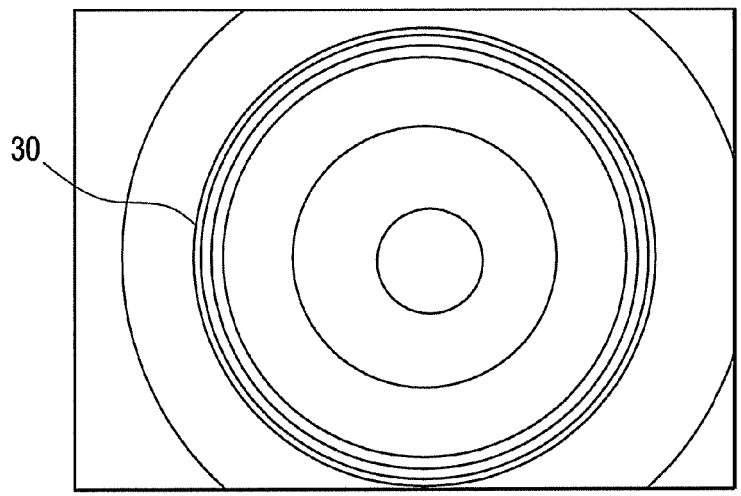
FIG. 18 is a photograph of the front of an encoder disk with one side painted black according to at least an embodiment.
Figure 19:
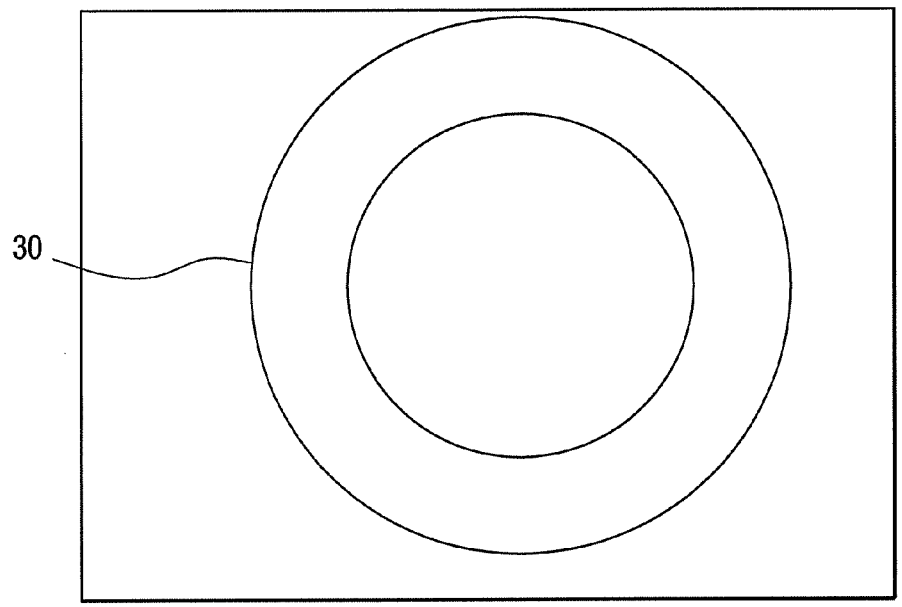
FIG. 19 is a photograph of the back of an encoder disk with one side painted black according to at least an embodiment.

It is also noted that the embodiment of FIGS. 17-19 shows a clear region in the center of the encoder disk 30. This clear region allows UV adhesive to be applied to mount the encoder of this embodiment in a cartridge.

Regarding two chrome layer encoders (such as encoder 400 seen in FIGS. 41 and 42), calibration and testing was done to evaluate the performance of the encoders. The results are summarized below in Table 1. The left column of Table 1 indicates the serial number of the encoder being tested, and the right column of Table 1 is the sigma of the encoder measured in degrees.

TABLE 1

| RH SN | Sigma (deg) |
|---|---|
| 18 | 0.00012 |
| 36 | 0.00009 |
| 45 | 0.00010 |
| 58 | 0.00009 |
| 60 | 0.00011 |
| 62 | 0.00009 |
| 68 | 0.00009 |
| 69 | 0.00011 |
| 71 | 0.00009 |
| 75 | 0.00009 |
| 76 | 0.00011 |
| 80 | 0.00010 |
| 87 | 0.00011 |
| 92 | 0.00009 |
| AVG | 0.000099 |
| Std Dev | 1.07161E-05 |

It is noted that these results indicate an improvement of at least 25% over conventional encoder heads.

Figure 43:
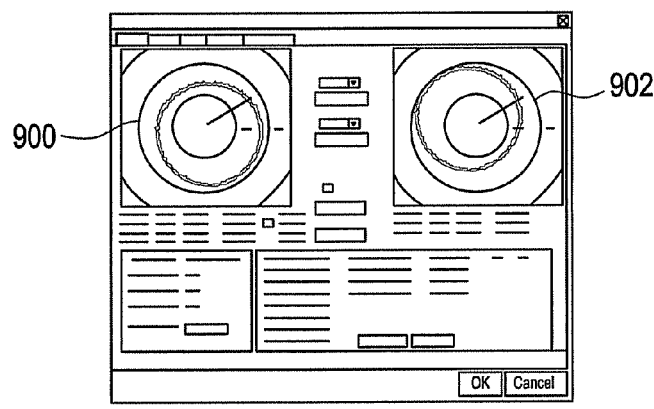
FIG. 43 is a Lissajous pattern of outputs of quadrature channels before gain modification.
Figure 44:
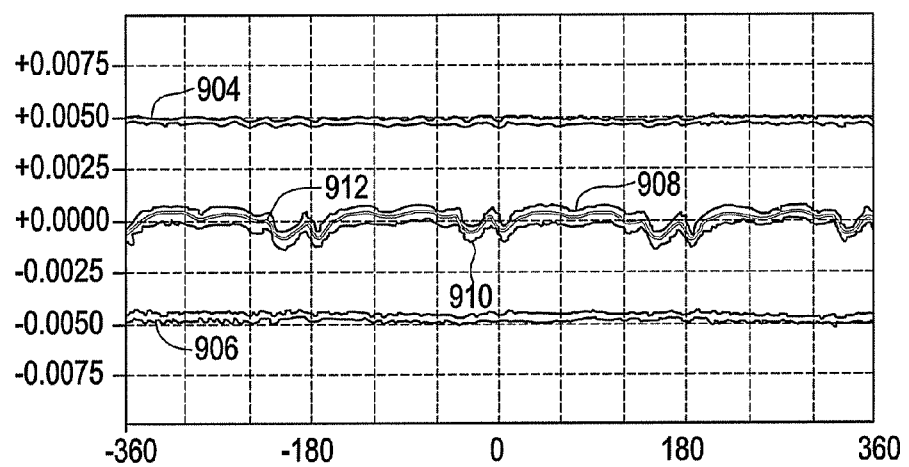
FIG. 44 are graphs showing data regarding read head calibration.
Figure 45:
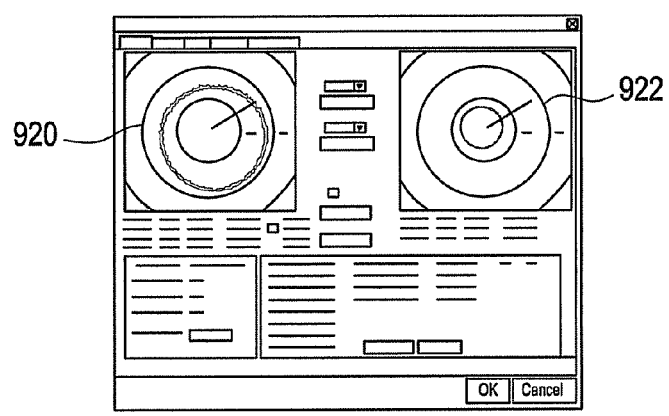
FIG. 45 is a Lissajous pattern of outputs of quadrature channels after gain modification.
Figure 46:
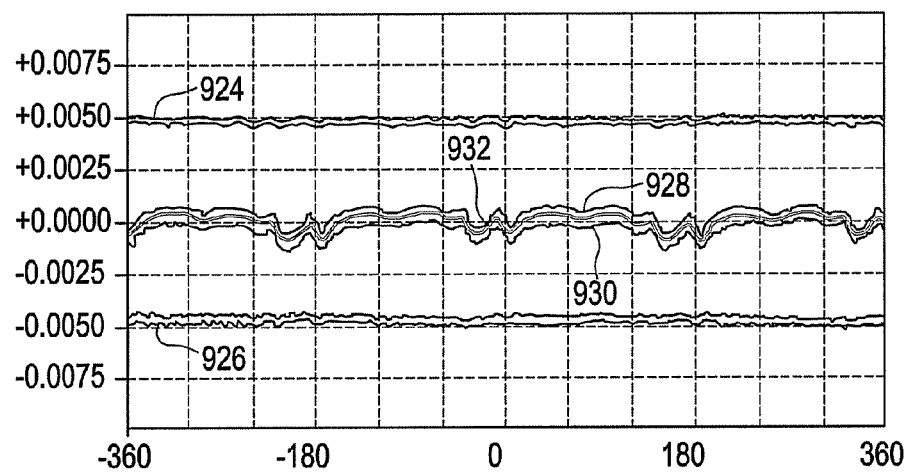
FIG. 46 are graphs showing data regarding read head calibration.

FIGS. 43-46 also illustrate calibration data for read heads. FIGS. 43-44 show data before gain modification, and FIGS. 45-46 show data after gain modification. FIG. 43 shows Lissajous curves 900, 902 based read head signals. In FIG. 44, lines 904, 906 illustrate errors in the read head positions (offset for clarity). Upper line 908 is a plot of the average position of two read heads in the clockwise direction. Lower line 910 is a plot of the average position of the two read heads in a counterclockwise direction. Center line 912 is an average position of the read heads from both directions. FIG. 45 shows Lissajous curves 920, 922 based on read head signals. In FIG. 46, lines 924, 926 illustrate errors in the read head positions (offset for clarity). Upper line 928 is a plot of the average position of two read heads in the clockwise direction. Lower line 930 is a plot of the average position of the two read heads in a counterclockwise direction. Center line 932 is an average position of the read heads from both directions.

Figure 47:
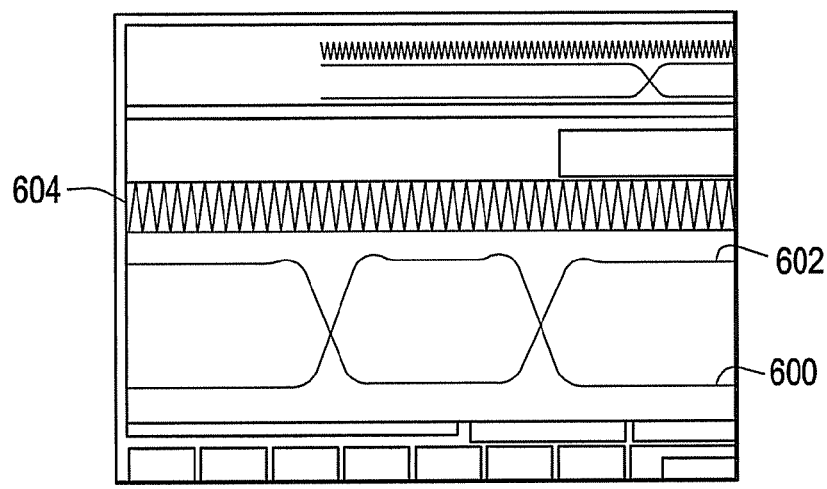
FIGS. 47-49 are graphs showing outputs from a two chrome layer encoder disk.
Figure 48:
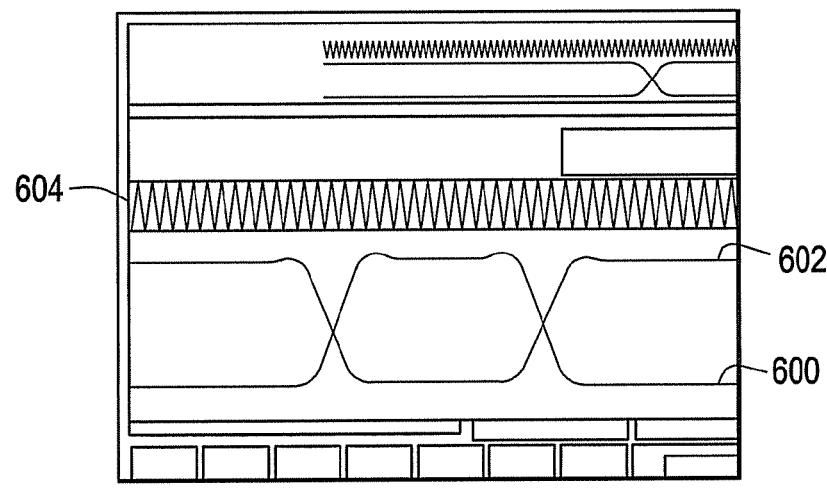
Figure 49:
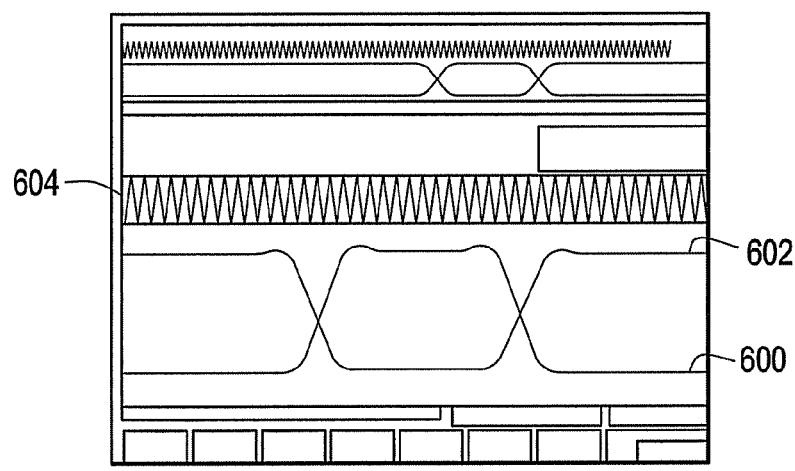
Figure 50:
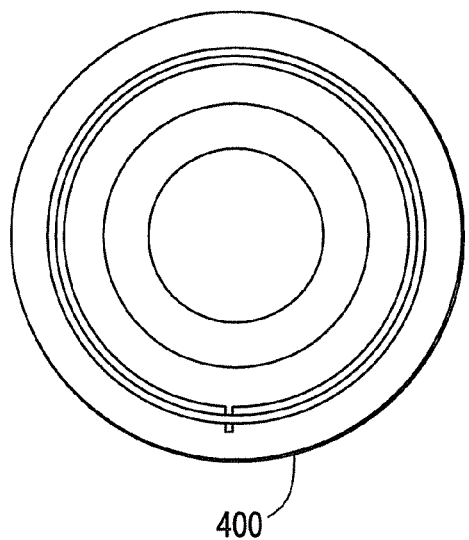
FIGS. 50-55 are various views of two chrome layer encoder disks.

FIGS. 47-49 illustrate outputs from a two chrome layer encoder used in performance testing. In FIGS. 47-49, line 600 represents a ring with a reflective index mark, line 602 represents a ring with a non-reflective index mark, and line 604 represents a quadrature signal.

Using the two-chrome layer structure, FIGS. 47-49 show that the dark levels from a non-reflective ring with reflective mark and a reflective ring with a non-reflective mark were below 0.35 VDC, and were matched to within 0.16 VDC of each other. On average, the dark level voltage for the non-reflective ring with reflective mark was measured to be 0.16 VDC and the dark level voltage for the reflective ring with non-reflective mark was measured to be 0.26 VDC.

Regarding the quadrature signal level, in one chrome layer structure, the specifications are as follows:
Sinusoidal (phase) DC offset=1.4+/−0.8 VDC
Sinusoidal (phase) AC signal=0.4 Vp-p to 2.2 Vp-p
Post Cartridge Electronics, output specification is as follows:
Sinusoidal (phase) DC offset (at DSP)=1.67+/−0.3 VDC
Sinusoidal (phase) AC signal (at DSP)=0.45 to 2.70 p-p (1.1 Vp-p typical)

In a two chrome layer structure, the read head transfer function is attenuated by a factor of 0.8. A gain adjustment can be made to the cartridge boards if necessary. For example, input attenuator resistor values can be changed from 20 k to 13 k. Alternatively, Instrumentation Amplifier Gain can be changed from 2.42 to 3.0 by changing gain resistors from 34.8 k to 24.9 k.

Overall, the two chrome layer structure on the encoder glass improves the cartridge system in two ways. First, unwanted reflections are attenuated, thus improving the index signals by reducing DC offsets. Second, quadrature signals are more consistent and have less spatial noise.

It was also found that the quadrature signal quality does not change significantly as the beam profile of a VCSEL changes from a Gaussian shape to a non-Gaussian shape. The device described above can control a multi-mode laser profile via an optical power monitoring scheme.

Figure 20:
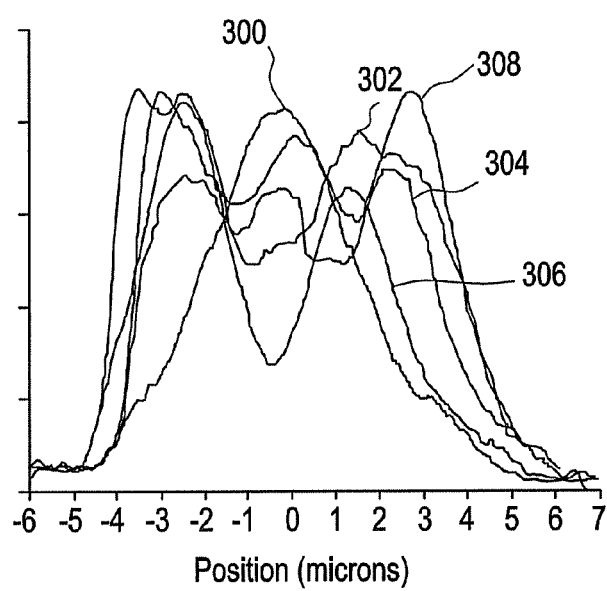
FIG. 20 is a graph showing various beam profiles of a multi-mode VCSEL according to at least an embodiment.
Figure 21:
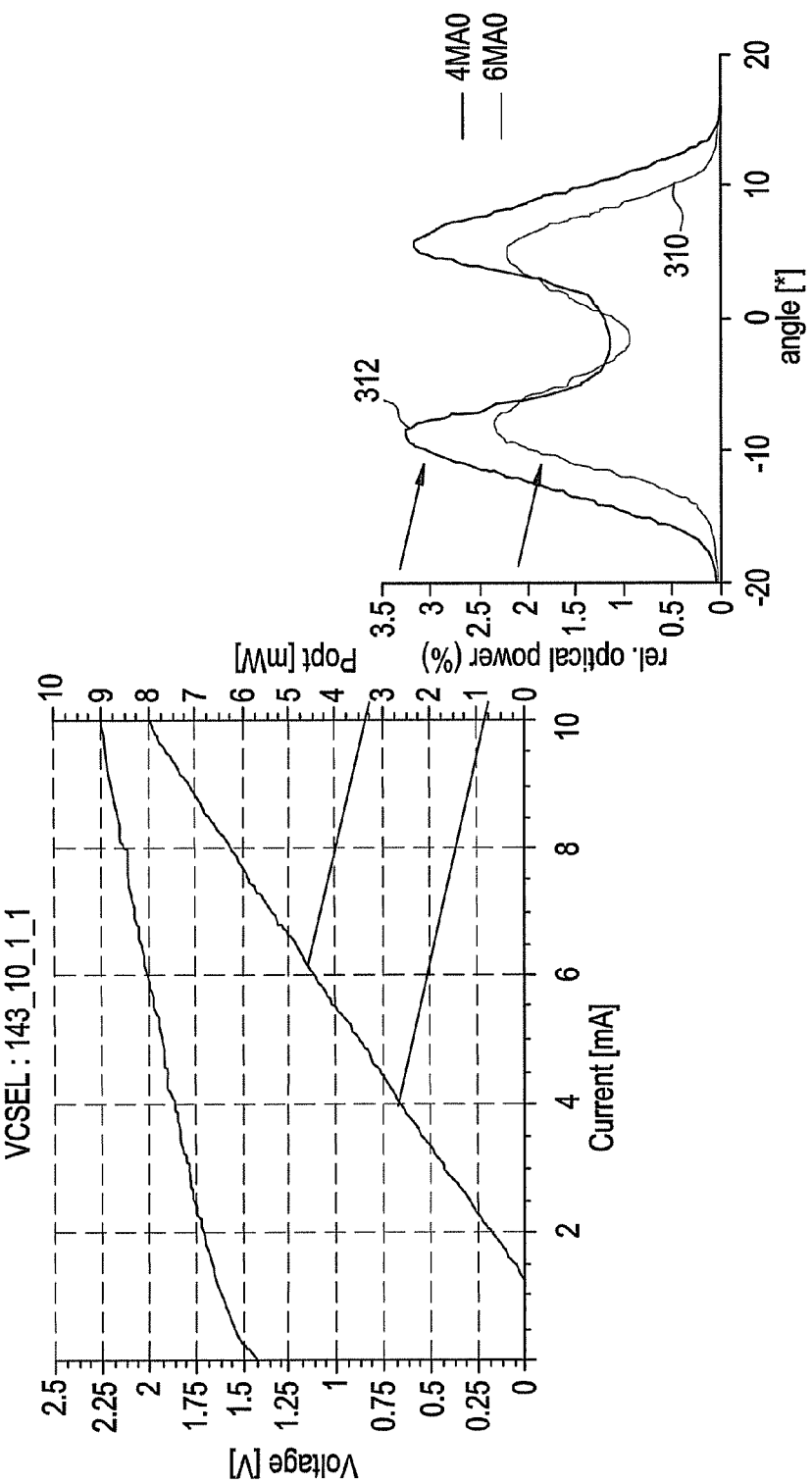
FIG. 21 is a graph showing the relationship between current and beam profile in a multi-mode VCSEL.

Multi-mode lasers exhibit Gaussian beam profile at low drive current and change into an Laguerre-Gaussian {1, 0} profile (3-D appearance is similar to that of a volcano—with a reduction in optical power toward the center—the "crater") at higher VCSEL currents (see FIG. 20, which shows various profiles 300, 302, 304, 306, 308 of a multi-mode VCSEL). Notice that the beam width increases with VCSEL current when in multi-mode, as seen in FIG. 21. For example, in FIG. 21, beam profile 310 is the beam profile at 4 mA current, and beam profile 312 is the beam profile at 6 mA current.

The quadrature signals described above are relatively distortion free in either Gaussian or non-Gaussian modes due to the wide spatial collection of energy due to diffraction.

During experiments the VCSEL current was reduced using narrow beam VCSELs (laser beam waist on the order of 12 degrees. At nominal bias (4.75 mA) good quality Lissajous circles were displayed. This was essentially an LG {1, 0} profile. As the VCSEL current was lowered below 4.3 mA it was noticed that the circle grew (increased signal strength). However the circle quality remained the same. This continued until about 3 mA, and then the circle began to shrink.

This phenomenon was due to the increase in optical energy applied to the encoder scale's grating as the beam shape changed from LG to Gaussian. Note during the change over a reduction in VCSEL current results in an INCREASE in quadrature signal strength.

For VCSELs which are mostly Gaussian (wide beams with a waist of 20 degrees or more the circle quality remains good but the quadrature signals vary linearly and monotonically with VCSEL current.

For at least one embodiment of the device described above, the VCSEL current is adjusted so that narrow beam VCSELs are well into the non-Gaussian region. This avoids a non-monotonic mode which would make the laser power control optical power loop unstable.

One method of controlling a laser diode or LED (emitting element) is via a constant current source. This technique minimizes the sensitivity to the forward diode drop due to temperature. In some cases temperature sensing is used to adjust the current and compensate the optical output drift due to temperature.

A second method uses optical feedback to compensate. The optical power is measured by a separate photo detector, either within the same package or a separate photo sensor.

The present encoder preferably uses the second method but with an additional purpose. Power adjustment of a multimode VCSEL can lead to pronounced changes in beam width and shape. This characteristic is used to optimize the signal to noise ratio due to spatial distortion.

Therefore, benefits extend beyond compensating the sine/cosine and index channels for drift due to temperature and ageing.

Optical encoders use precision rulings on linear or rotary glass scales. These rulings provide a position reference that can be used to measure relative motion between an optical read head and the scale. Often, two quadrature sinusoidal signals are output. Measuring electronics count zero crossings and may also interpolate between zero crossings The present encoder is based on the non-direct imaging technique called Talbot imaging. This type of encoder relies on interference between grating diffraction orders. For Talbot imaging, interference between overlapping diffraction orders produces a pseudo-image that resembles the scale rulings.

Figure 22:
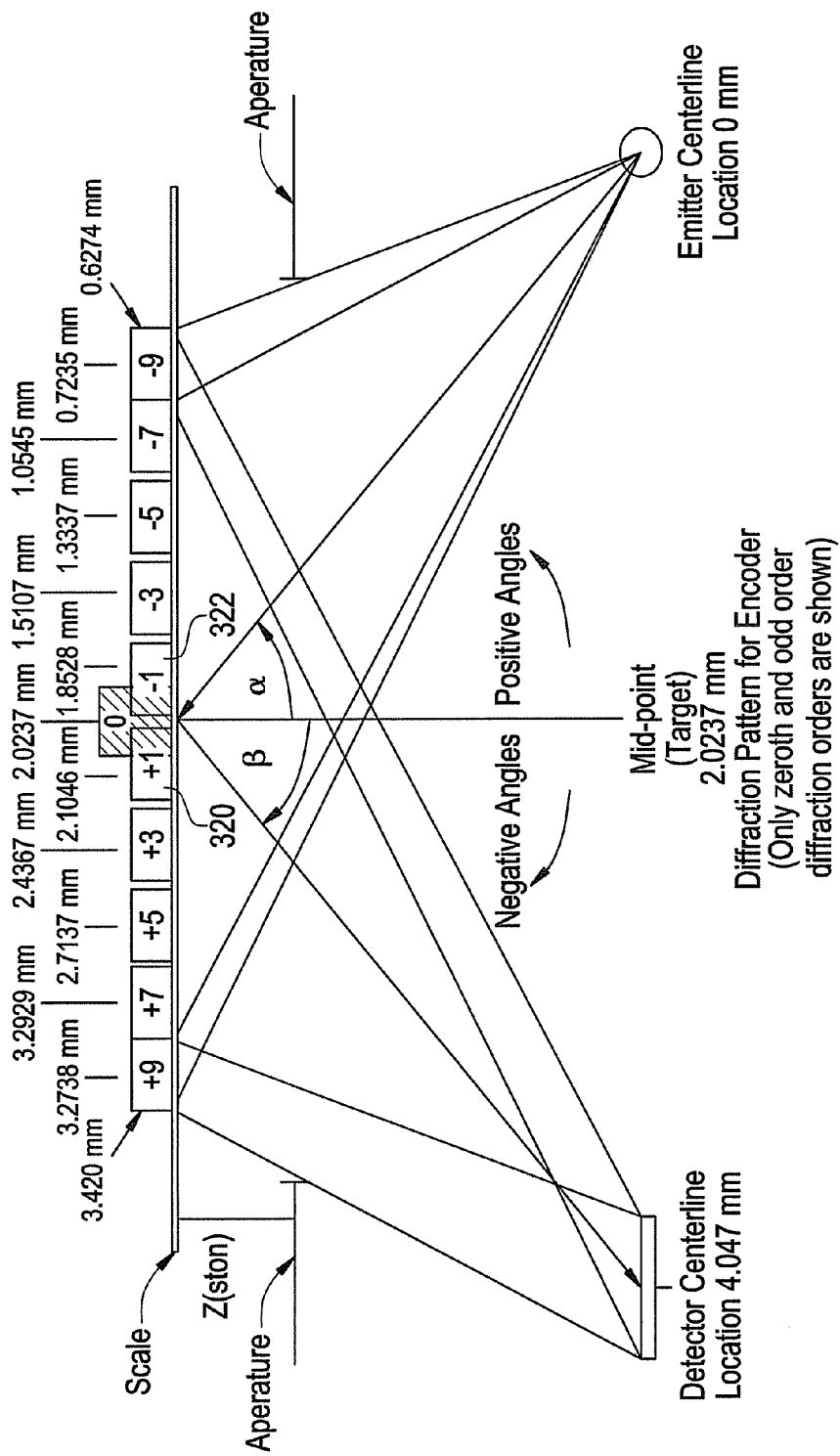
FIG. 22 is a diagram showing a diffraction patter for an encoder according to at least an embodiment.

FIG. 22 depicts the diffraction pattern of the present encoder. The desired information comes from the +1 diffraction band 320 and −1 diffraction band 322. However, a mask is not used to perform a spatial filtering as in the U.S. Pat. No. 7,002,137 to Thorburn. Instead, all of the diffraction orders are passed to the sensor head and then an algorithm filters them electronically.

Laser Diodes—Single-Mode and Multi-Mode Laser Diodes.

Figure 23:
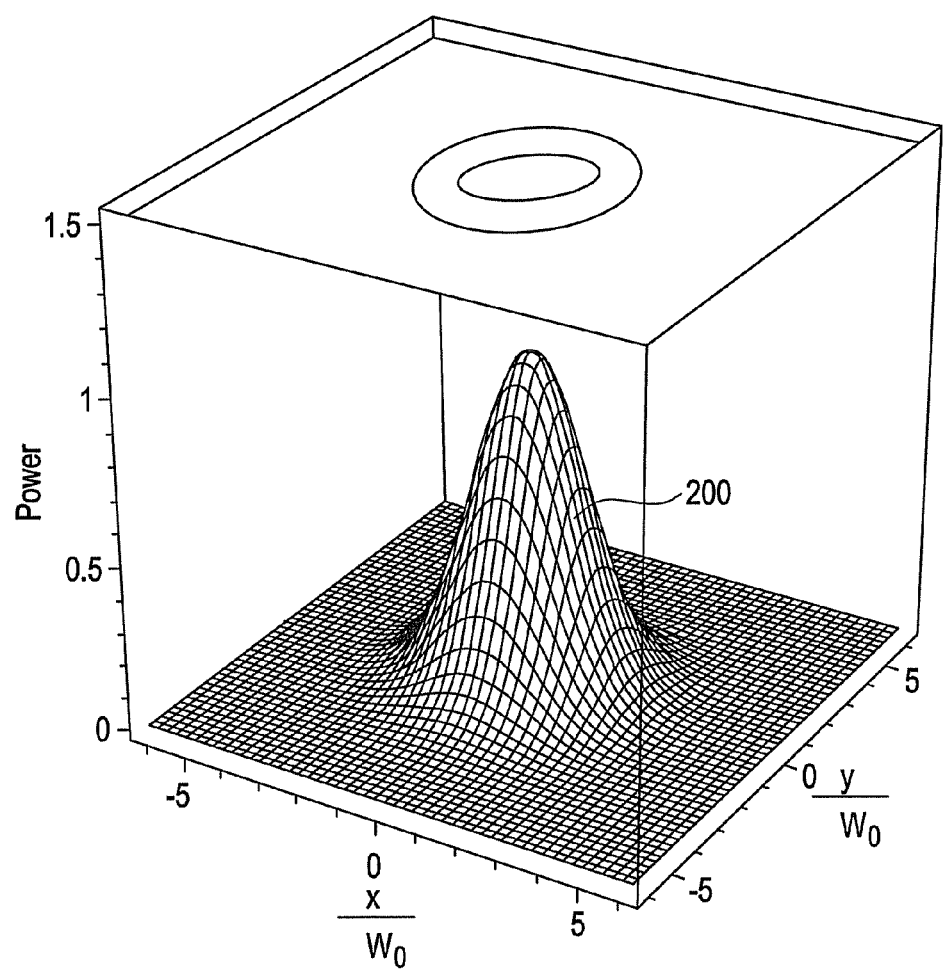
FIG. 23 is a three-dimensional graph showing a Gaussian beam profile.
Figure 24:
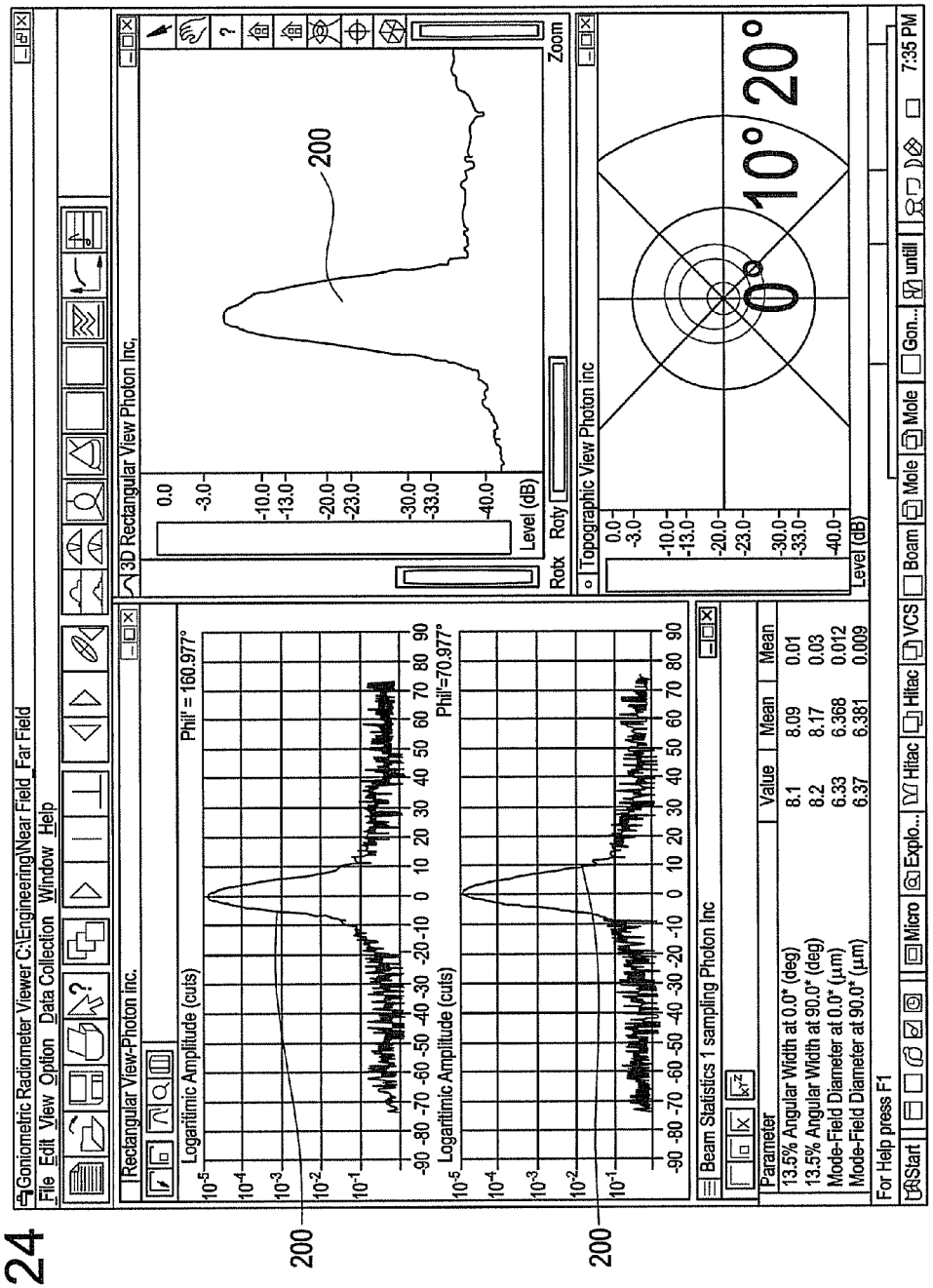
FIG. 24 is a display showing a Gaussian beam profile.
Figure 25:
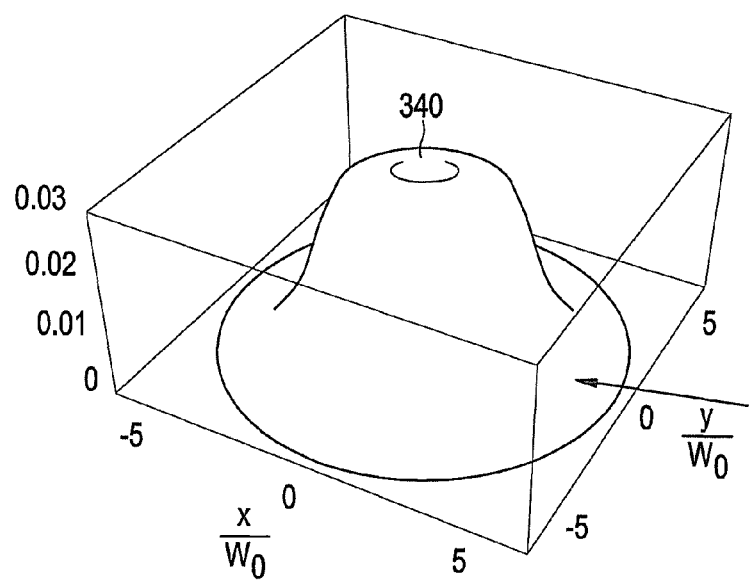
FIG. 25 is a graph showing a beam profile of a multi-mode VCSEL according to at least an embodiment.
Figure 26:
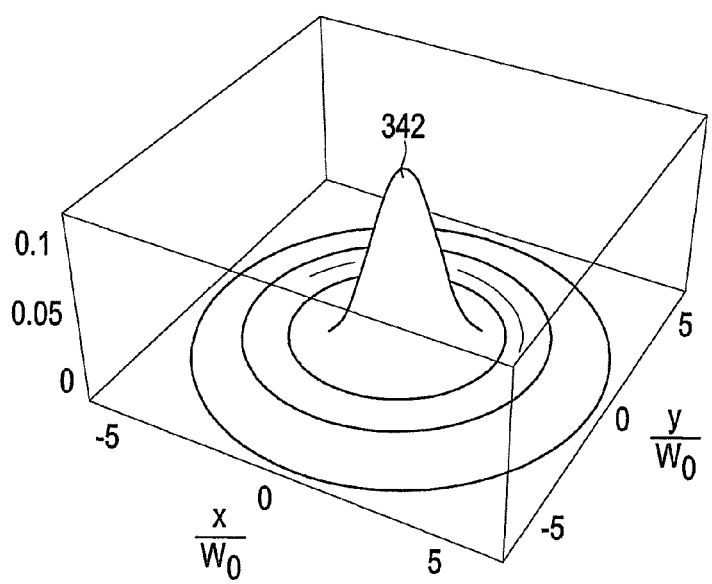
FIG. 26 is a graph showing a beam profile of a multi-mode VCSEL according to at least an embodiment.
Figure 27:
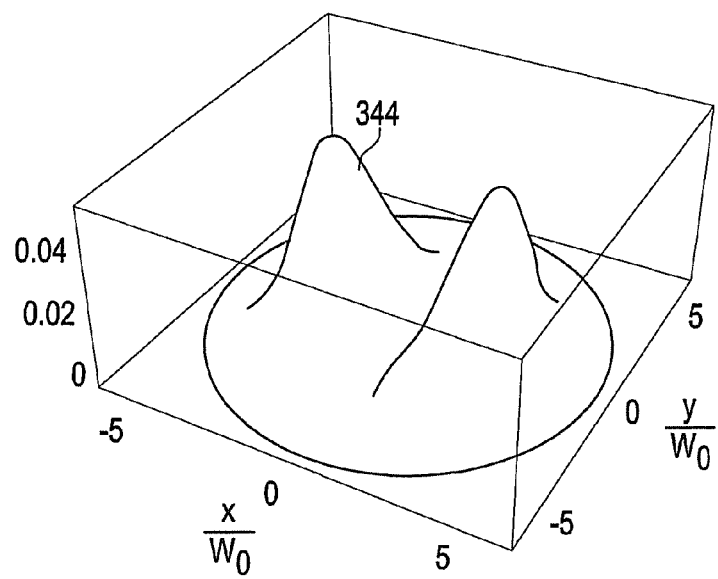
FIG. 27 is a graph showing a beam profile of a multi-mode VCSEL according to at least an embodiment.
Figure 28:
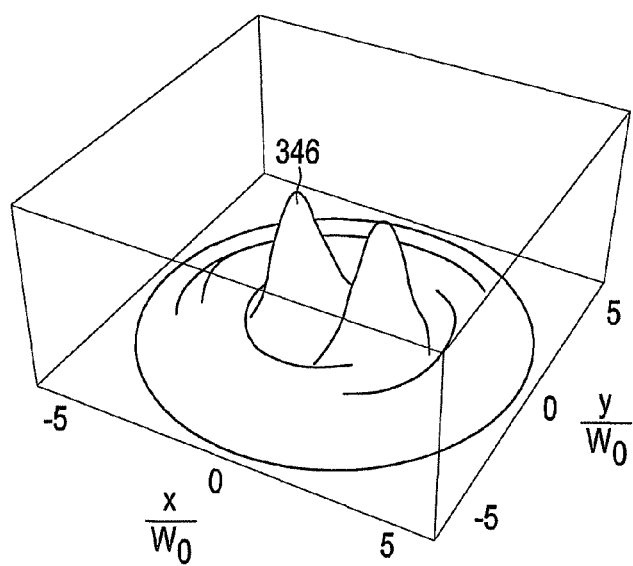
FIG. 28 is a graph showing a beam profile of a multi-mode VCSEL according to at least an embodiment.

Single-mode (designated TEM 00) lasers produce a single round spot with a Gaussian profile 200 as shown in FIGS. 23 and 24

Figure 29:
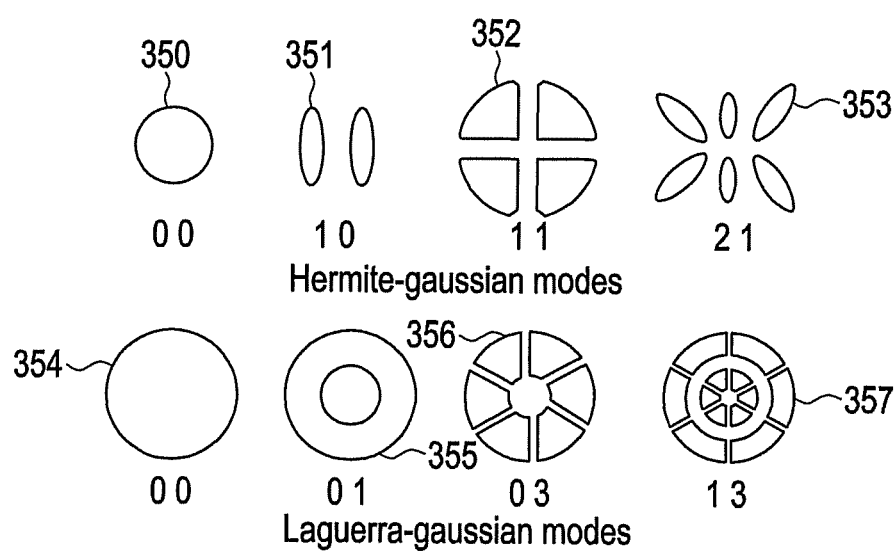
FIG. 29 is a diagram showing various beam profiles of a multi-mode VCSEL according to at least an embodiment.

Multi-mode lasers on the other hand exhibit resonance areas. Various peaks and valleys can occur. For example, FIGS. 25-28 show three-dimensional views of various possible beam profiles 340, 342, 344, and 346 of multi-mode lasers. FIG. 29 shows cross sections 350-357 of various possible beam profiles.

Figure 30:
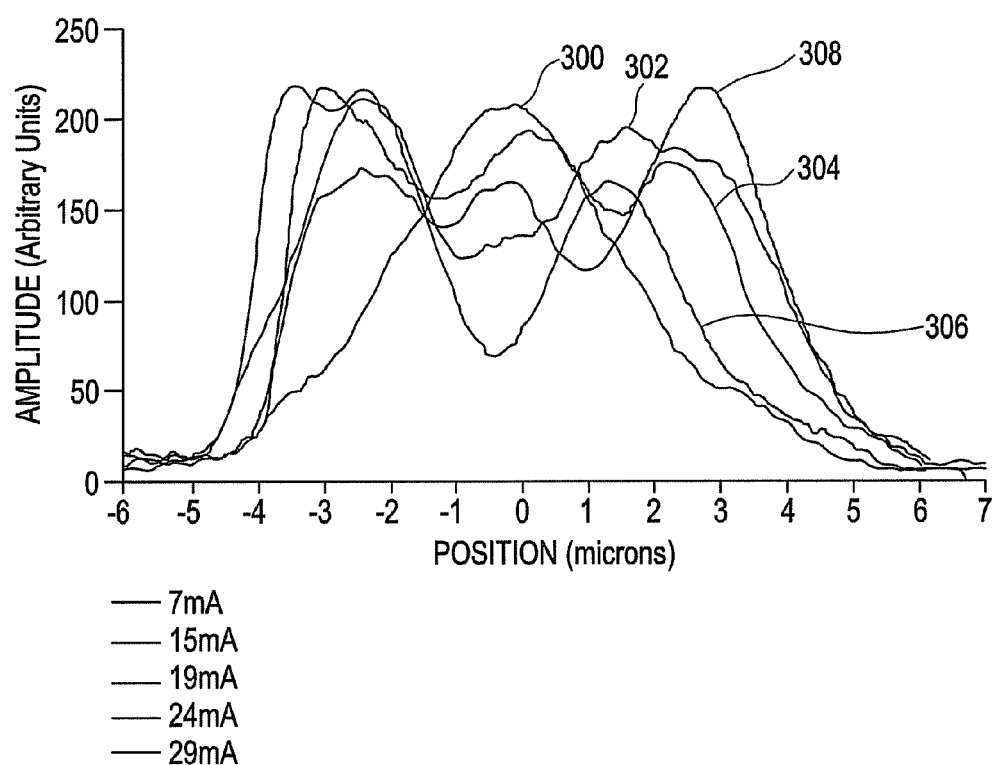
FIG. 30 is a graph showing various beam profiles of a multi-mode VCSEL according to at least an embodiment.
Figure 31:
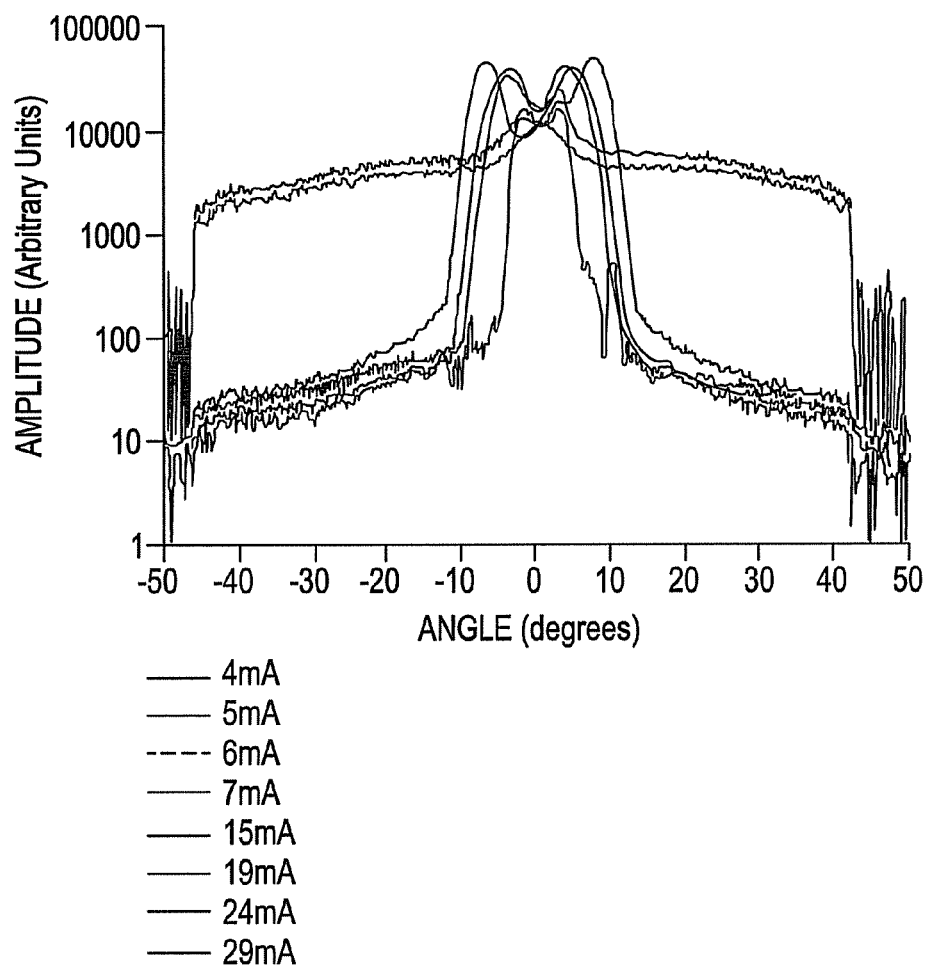
FIG. 31 is a graph showing various beam profiles of a multi-mode VCSEL according to at least an embodiment.
Figure 32:
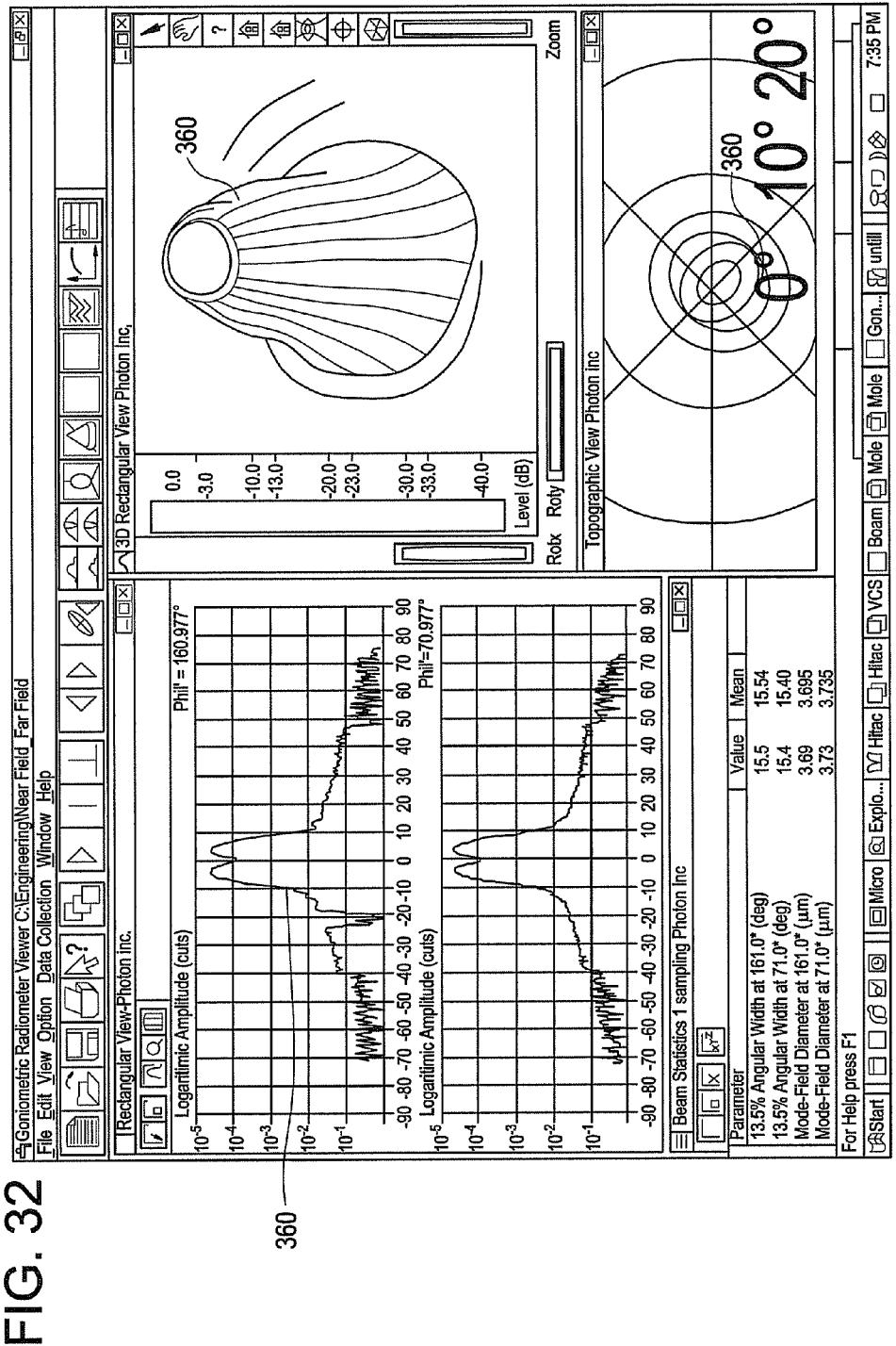
FIG. 32 is a display showing a beam profile of a multi-mode VCSEL according to at least an embodiment.

VCSEL Beam Profiles:

Multi-mode VCSELs normally generate patterns based on Laguerre-Gaussian (LG) profiles. At low power they provide a Gaussian profile, at higher power levels LG [1,0] are common as seen in FIGS. 30-32. For example, FIG. 32 shows various views of a beam profile 360 of a multi-mode laser.

Figure 33:
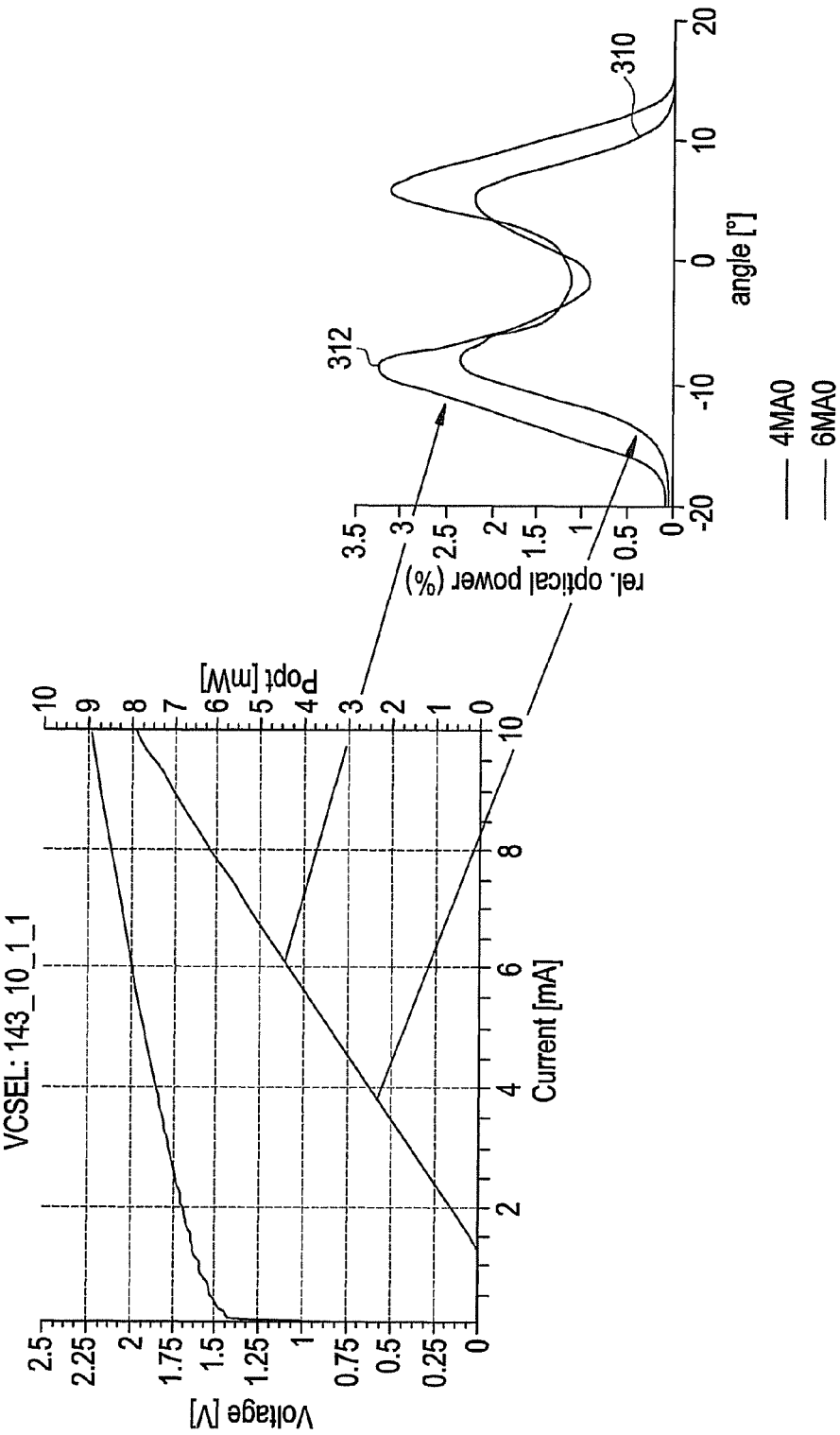
FIG. 33 is a graph showing the relationship between current and beam profile for a multi-mode VCSEL according to at least an embodiment.
Figure 34:
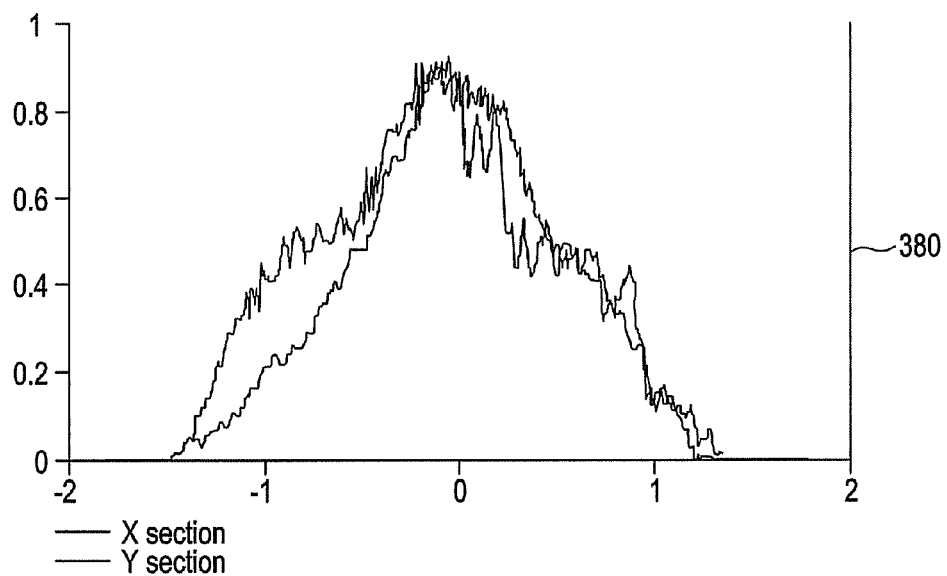
FIG. 34 is a graph showing a Gaussian beam profile.
Figure 35:
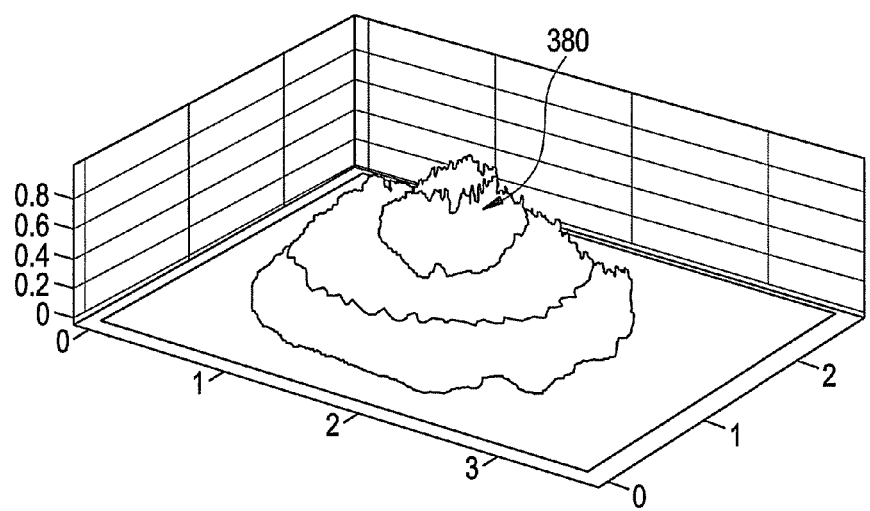
FIG. 35 is a graph showing a Gaussian beam profile.
Figure 36:
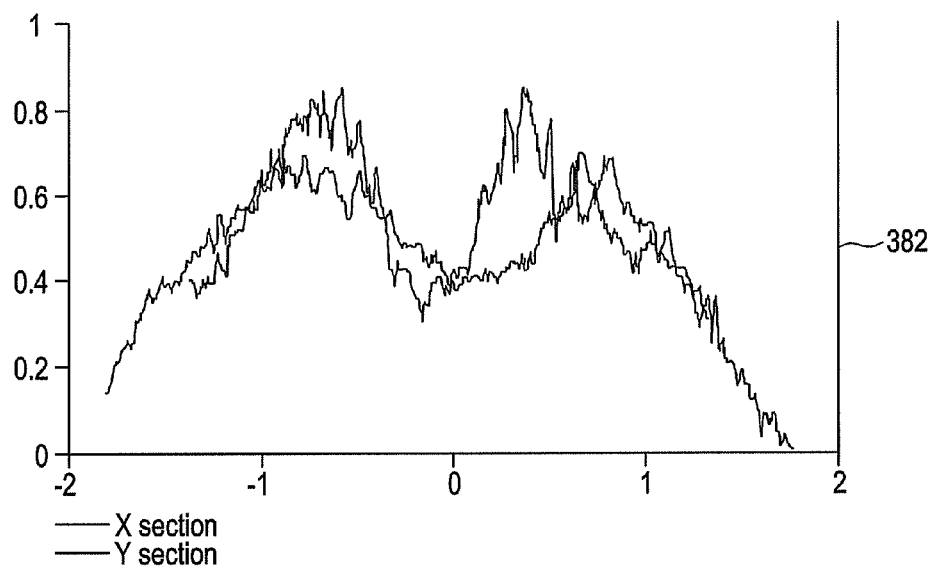
FIG. 36 is a graph showing a non-Gaussian beam profile of a multi-mode VCSEL according to at least an embodiment.
Figure 37:
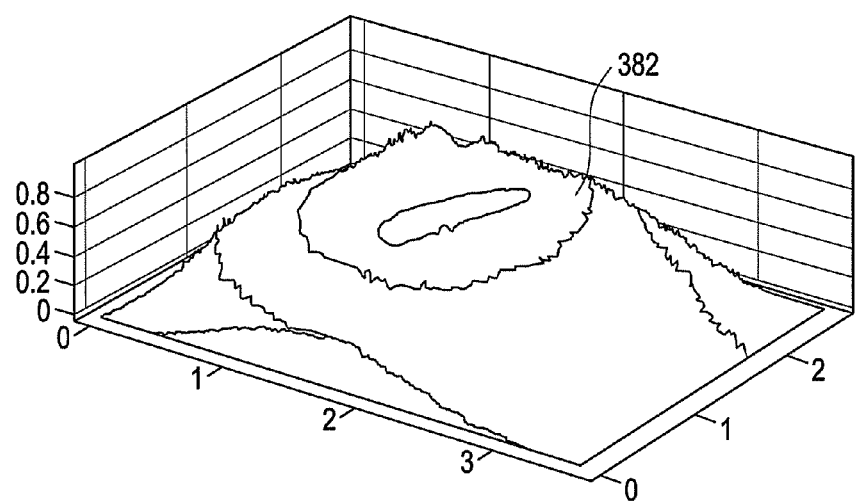
FIG. 37 is a graph showing a non-Gaussian beam profile of a multi-mode VCSEL according to at least an embodiment.

The present encoder preferably uses an LG [1, 0] VCSEL which has a general profile/current transfer function (when in multi-mode) as shown in FIG. 33. Actual test data can be seen in FIGS. 34-37. For example, FIGS. 34 and 35 show a beam profile 380 at 2.75 mA. The two lines in FIG. 34 correspond to the profile in the x and y directions. Similarly, FIGS. 36 and 37 show a beam profile at 4.75 mA.

Figure 38:
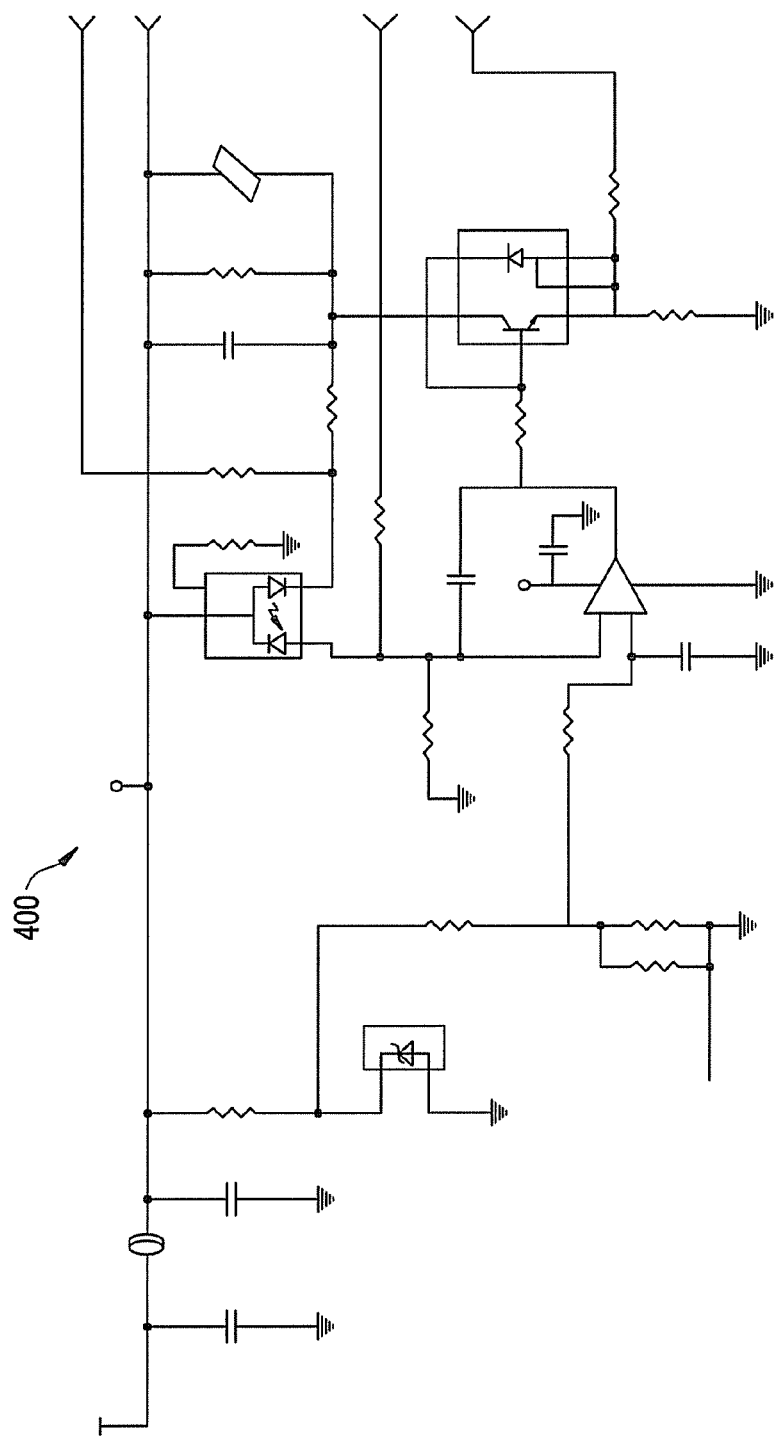
FIG. 38 is a diagram of a VCSEL power control circuit according to at least an embodiment.

FIG. 38 shows one possible embodiment of VCSEL optical power control circuit 400. Note that in the embodiment shown in FIG. 38, resistor R14 is programmable (i.e., set point control).

The ability to control the laser beam shape gives rise to an optimization of performance. An encoder can be rotated at a certain frequency (by motor) and a DFT (Discreet Fourier Transform) performed. Thus, the optical power set point can be adjusted to give the best signal /noise (SNR), and spatial harmonic distortion is minimized.

Additionally, the power control described above helps to compensate for quadrature and index signal drift due to temperature and VCSEL ageing.

The VCSEL profile control described above has a number of advantages over conventional profile controls.

For example, by peaking the laser beam profile near the +/−1 diffraction order locations, higher order spatial harmonics are reduced relative to the first order spatial harmonic (comprised of the +/−1 diffraction order. However, it is also important to note that herein it is not necessary in this method to use a physical mask to block unwanted harmonics. This is at least because digital signal processing (DSP) may be used instead of using spatial filtering and/or masks for example. In other words, all of the of harmonics such as fifth order beams or higher, whether usable or not, can reach the detector if desired. This simplifies construction significantly over the prior art.

Additionally, multi-mode (i.e., non-Gaussian) laser diodes are more reliable than single-mode laser diodes. Construction is more robust as power handling is higher for multi-mode VCSELs. In contrast, single-mode channels are narrow in order to reduce resonances, and they tend to be very sensitive to voltage stress and electrostatic discharge. Also, cost can be minimized by using multi-mode VCSELs, because finer techniques must be employed to produce the pure Gaussian beam profile of a single-mode.

Figure 39:
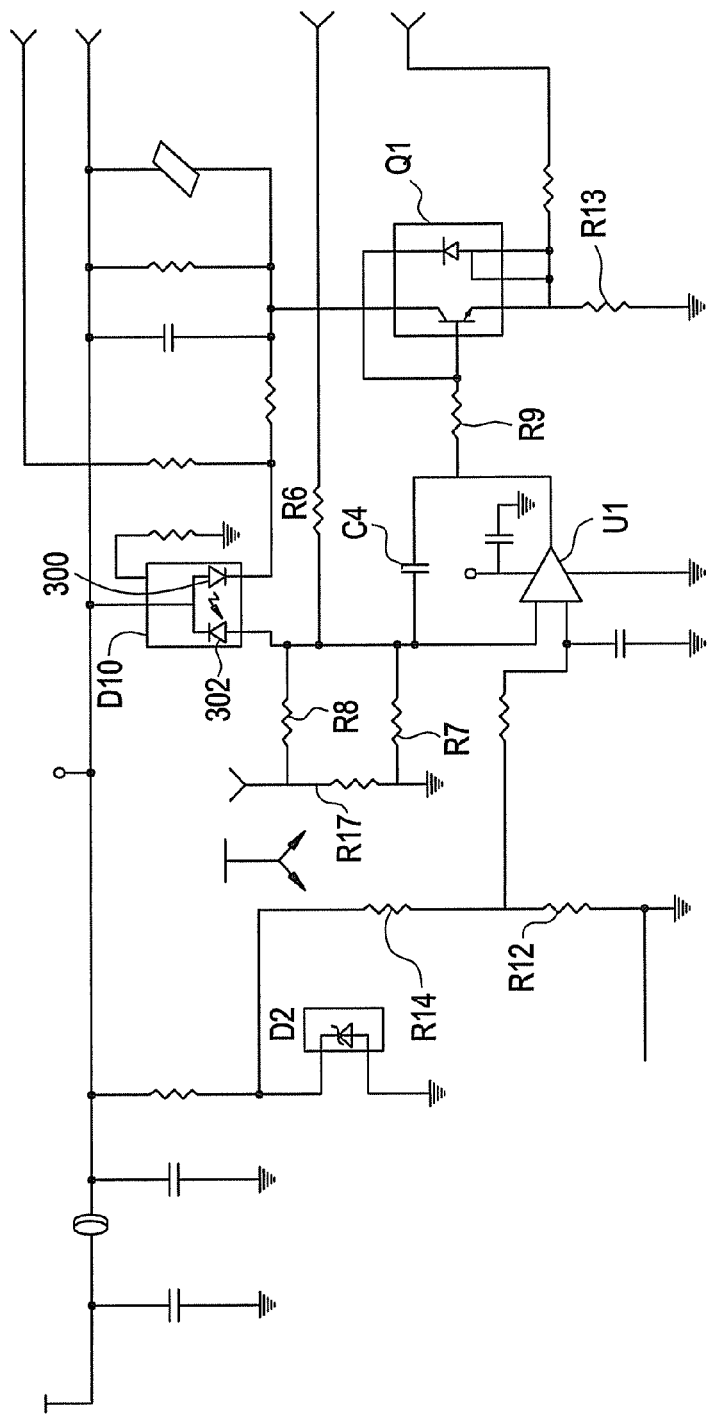
FIG. 39 is a diagram of a VCSEL power control circuit according to at least an embodiment.

FIG. 39 illustrates another possible embodiment of the VCSEL control. For example, VCSEL component D10 may comprise a metal package, a window (for dust protection), the VCSEL 300 and a photo-detector 302. A small portion of the laser light is reflected back from the window and excites the photo-detector 302. Therefore, the amount of optical energy transmitted can be obtained by monitoring the internal photo-detector's current.

Figure 40:
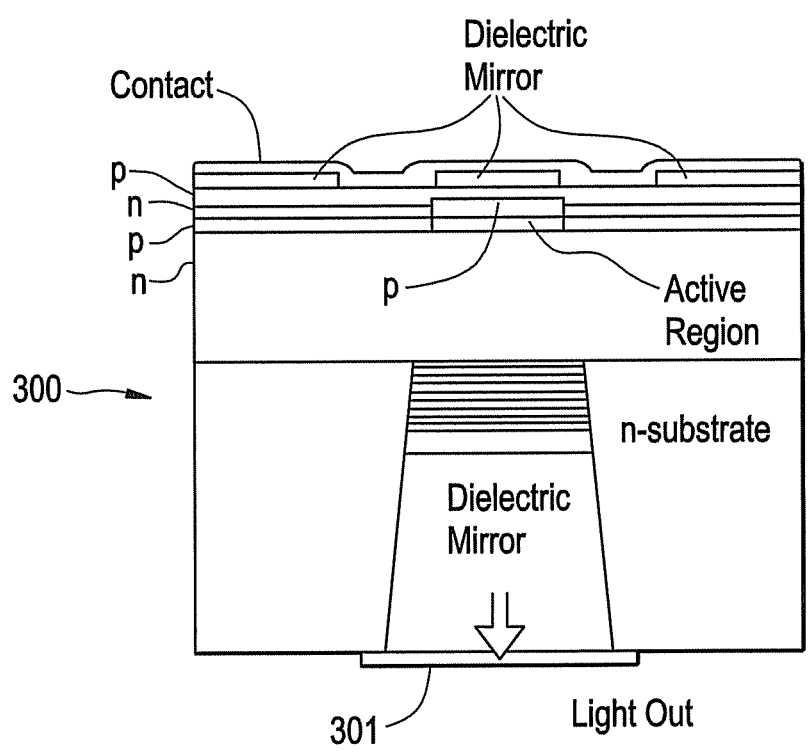
FIG. 40 is a diagram of a VCSEL.

FIG. 40 shows at least one possible embodiment of a VCSEL 300. The invention is not limited to this particular VCSEL however, and any other appropriate VCSEL, LED, or other appropriate light source can be used. FIG. 40 also shows a window 301 as part of the VCSEL.

As seen in FIG. 39, the feedback current from the photo-detector 302 is converted into a voltage ($V_{MON}$) via resistor R7 or resistor R7 in parallel with resistor R8. The parallel combination is used when the dynamic range of control is to be increased. Note that resistor R17 is normally not mounted, when a zero ohm resistor is mounted in this position the parallel combination can be formed.

Op-amp U1 and transistor Q1 form a voltage to current converter. $V_{Bias}$ is the set point voltage. The feedback loop formed by Op-amp U1, transistor Q1, capacitor C4, VCSEL component D10, and resistor R7 (or resistor R7 in parallel with resistor R8) changes the current in the laser diode (LD) until $V_{MON}=V_{BIAS}$. That is the optical power is adjusted by varying the VCSEL current until the feedback current*resistor R7 (or resistor R7 in parallel with resistor R7 and resistor R8) is equal to $V_{Bias}$.

Op-amp U1 amplifies the error between $V_{MON}$ and $V_{Bias}$. Capacitor C4 sets the bandwidth. The output voltage (Vout–U1 pin 1) from op-amp U1 is applied through resistor R9 to the base of transistor Q1.

The emitter current of transistor Q1 is approximately [Vout–Vbe]/R13, where Vbe is the base emitter voltage of the transistor Q1 (~0.7 Volts) and R13 is the resistance of resistor R13 Note resistor R9's effect is negligible due to the fact that the base current is much less than the emitter or collector current by a factor of Beta (~180). Transistor Q1's collector current is equal to the VCSEL current and is approximately equal to the emitter current given by the above emitter current equation.

$V_{Bias}$ is determined by the reference diode (2.5 V) and the voltage divider formed by resistor R14 and resistor R12.

$V_{Bias}$ is normally selected to provide a nominal optical power or VCSEL current.

In either case, because of feedback, the optical power will remain constant over temperature and component variation (e.g. ageing).

It will also be understood that multi-mode VCSELs can have an unpredictable beam shape over variations in temperature. This may lead to non-linear amplitude and offset drifts for the quadrature signal used to interpolate position. Thus, conventional devices would have significant difficulty in implementing a VCSEL, and it is necessary to implement dynamic adjustment of gain and offset in order for VCSELs to be practical for encoders.

An example of dynamic adjustment of gain and offset is described below. While the discussion below refers to a single encoder read head, it will be appreciated that the dynamic adjustment method can also be incorporated into systems having multiple read heads.

Figure 56:
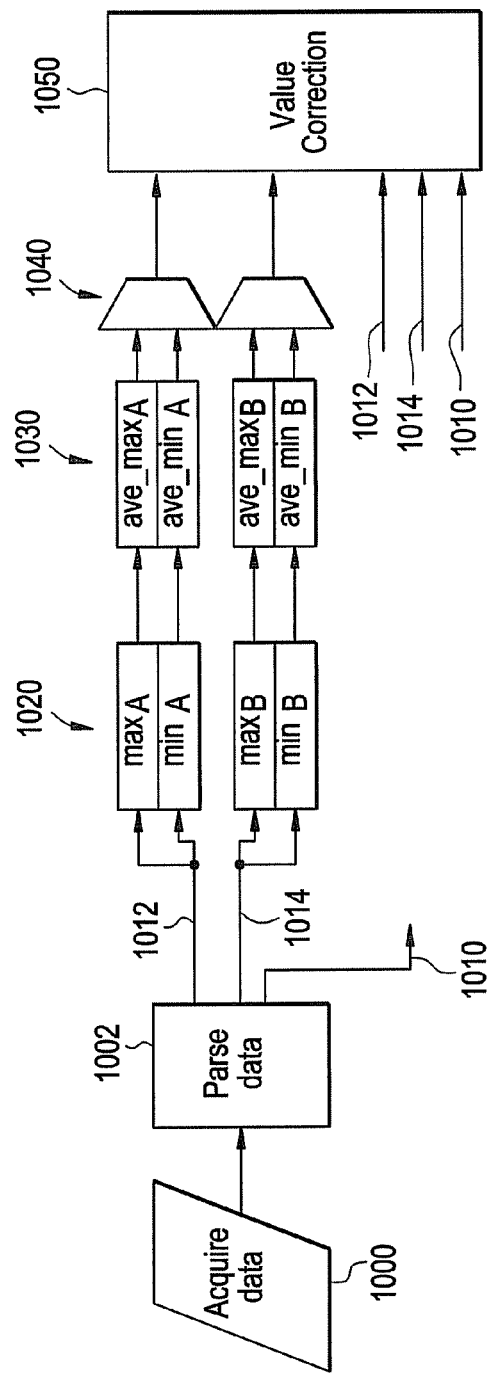
FIG. 56 is a schematic showing a dynamic parameter adjustment method.

FIG. 56 is a schematic to show at least one embodiment of dynamic adjustment of gain and offset. As seen in FIG. 56, raw data is acquired by a read head at 1000. At 1002, this raw data can be parsed into coarse count 1010, first fine count 1012, and second fine count 1014. It will be understood that fine counts 1012, 1014 represent the two channels of the fine count.

In summary, the dynamic adjustment has three different process steps: data qualification pre-filtering 1020, max/min moving average filtering 1030, and value correction 1040, 1050. After the data is parsed at 1002, the fine count is pre-filtered at 1020. Pre-filtering is used to acquire the three largest and three smallest samples in the data set. In at least one embodiment, threshold levels for the max and min data are used. For example, as 50% threshold or other suitable value can be used.

Figure 57A:
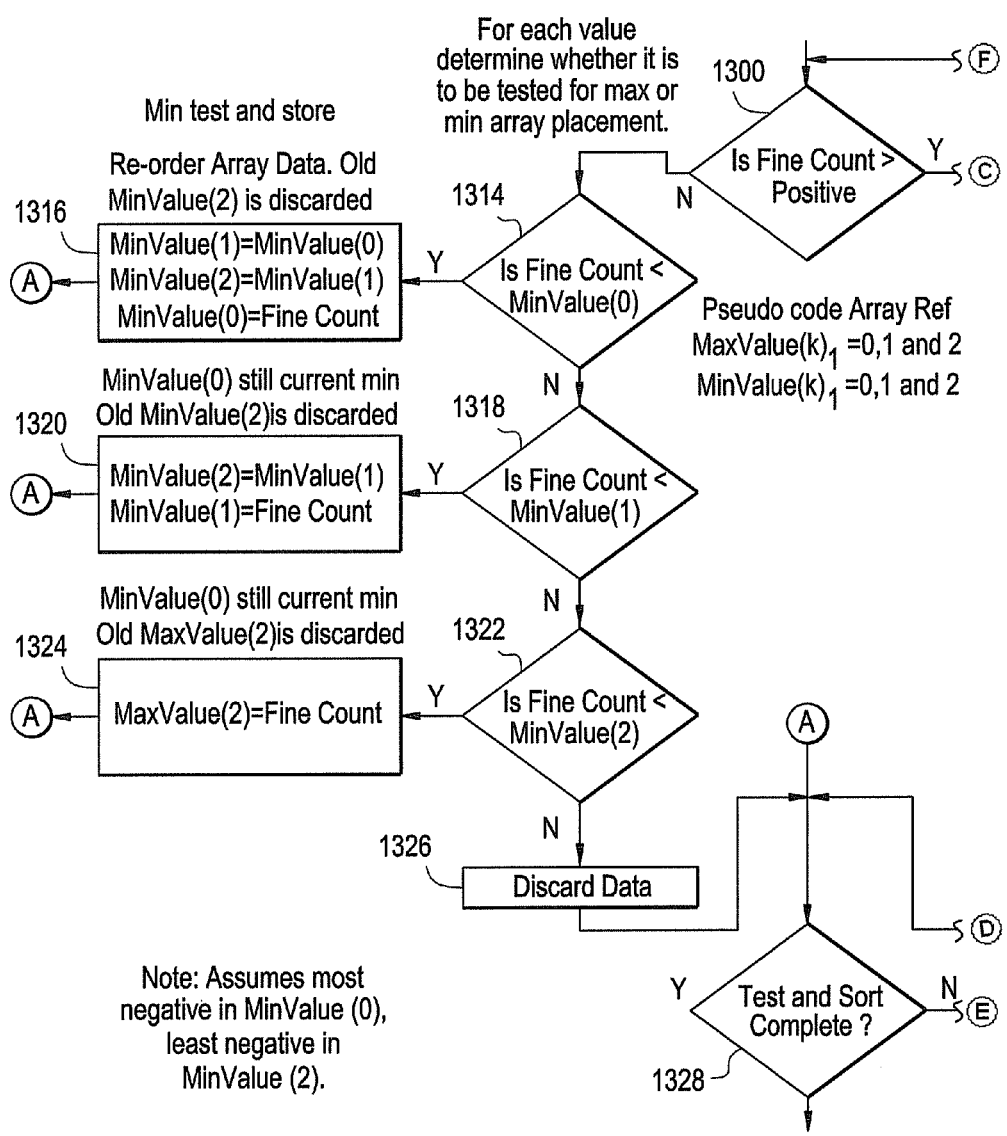
FIGS. 57A and 57B show a flowchart showing a pre-filtering method.
Figure 57B:
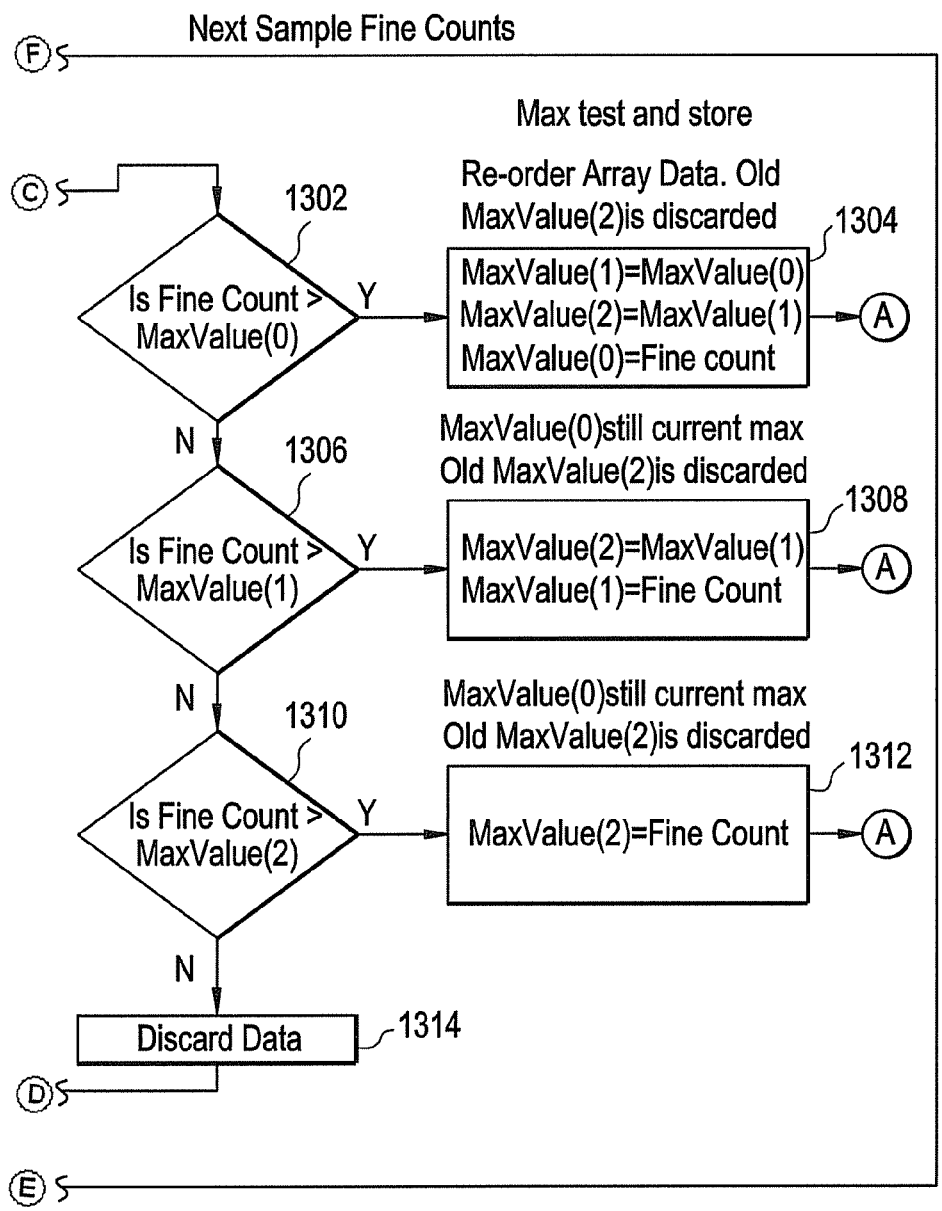

FIGS. 57A and 57B show at least one embodiment of a method for acquiring the three largest and three smallest samples in the data set.

At 1300, it is first evaluated whether the fine count is positive. If the fine count is positive, then it is a candidate for a maximum value. If it is negative, it is a candidate for the lowest value. There is an array for both the positive and negative values. MaxValue(0), MaxValue(1), MaxValue(2) are the maximum values, with MaxValue(0) being the highest. Similarly, MinValue(0), MinValue(1), MinValue(2) are the minimum values, with MinValue(0) being the lowest.

In step 1302, the fine count is compared to MaxValue(0). If fine count is greater than MaxValue(0), then the fine count becomes the new MaxValue(0) and the other members are the array are reordered (see step 1304). Otherwise, the fine count is compared to MaxValue(1) at step 1306. If the fine count is greater than MaxValue(1), then the fine count becomes the new MaxValue(1) and MaxValue(2) is adjusted accordingly (see step 1308). Otherwise the fine count is compared to MaxValue(2) at step 1310. If the fine count is greater than MaxValue(2), then the fine value becomes the new MaxValue (2) (see step 1312). If the fine count is less than teach value of the MaxValue array, than the fine count is discarded (see step 1313).

It will be understood that a similar method can be followed for each value of the MinValue array if the fine count is negative (see steps 1314-1326 in FIG. 57A). After the fine count is either stored to one of the arrays or discarded, it is evaluated whether the pre-filtering is complete (see step 1328).

Once the three largest and three smallest samples are acquired, screening methods can be performed on the data. If the data passes the screening checks, then the highest (maximum) value and the lowest (minimum) value are accepted to use in further calculations. It will be understood that a maximum and minimum value will be found for each fine count 1012, 1014. For example, if the screening is satisfied, pre-filtering 1020 will return a first fine count maximum $max_A$, a first fine count minimum, $min_A$, a second fine count maximum $max_B$, a second fine count minimum, $min_B$.

The first screening method is to determine whether each of the three highest values are within a predetermined range of their median, and whether each of the three lowest values are within a predetermined range of their median.

For example, in one embodiment the predetermined amount may be 1%. Therefore, for the three highest values, the lowest of the three should be greater than or equal to 0.99*the median value, and the highest of the three should be less than or equal to 0.99*the median value. Similarly, for the three lowest values, the highest value should be less than or equal to 0.99*the median value, and the lowest value should be greater than or equal to 1.01*the median value (it will be noted that the three lowest values should be negative).

If the above conditions are satisfied, then a second screening is performed. The second screening evaluates whether the maximum value and the minimum value are within 10% of the corresponding moving average filter 1030. This screening assumes that the moving average filter 1030 is completely filled first. For example, in at least one embodiment, the moving average filter 1030 includes five samples. The moving average filter 1030 will be discussed in more detail below. If the maximum and minimum values satisfy the screening, then the maximum and values are incorporated into the corresponding moving average filters and the oldest values are discarded from the tap register.

It is noted that in at least one embodiment, a data capture period is approximately 4 msec (250 Hz rate), and is the local sample rate. Thus, 1000 samples are collected in approximately 4 seconds, and T=4 seconds is the update rate for the moving average filter.

Once the pre-filtering 1020 is completed, the moving average filter 1030 is updated with the newly found minimum and maximum values. It will be understood that there will be a moving average filter for the minimum and maximum values of first fine count 1012 and second fine count 1014, shown in FIG. 56 as $ave\_max_A$, $ave\_min_A$, $ave\_max_B$, and $ave\_min_B$. The moving average filter 1030 is discussed below.

For a causal (M+1 point) Moving Average Value Filter (MAVF)—

$$y(n) := \frac{1}{(M+1)} \cdot \sum_{k} x(n-k) \text{ for } 0 \le k \le M$$

The delay ($\tau$) is MT/2 (T is the sample rate) and with M=4 for a five point filter, $\tau$=2T. With T=4 seconds (see above) then the filter delay is 8 seconds in one embodiment. Temperature variations are much slower than this.

It is assumed that the MAF is initialized with maximum and minimum values obtained during a calibration.

A slight improvement in computational efficiency can be achieved if the mean is calculated in a recursive fashion. A recursive solution is one that depends on a previously calculated value. To illustrate this, consider the following development:

Suppose that at any instant k, the average of the latest n samples of a data sequence, $x_i$ is given by:

$$\overline{x}_k = \frac{1}{n} \sum_{i=k-n+1}^{k} x_i.$$

Similarly, at the previous time instant, k−1, the average of the latest n samples is:

$$\overline{x}_{k-1} = \frac{1}{n} \sum_{i=k-n-1}^{k-1} x_i.$$

Therefore, $$\overline{x}_k - \overline{x}_{k-1} = \frac{1}{n}\left[\sum_{i=k-n+1}^{k} x_i - \sum_{i=k-n}^{k-1} x_i\right] = \frac{1}{n}[x_k - x_{k-n}]$$

On rearrangement, this gives:

$$\overline{x}_k = \overline{x}_{k-1} + \frac{1}{n}[x_k - x_{k-n}]$$

Figure 58:
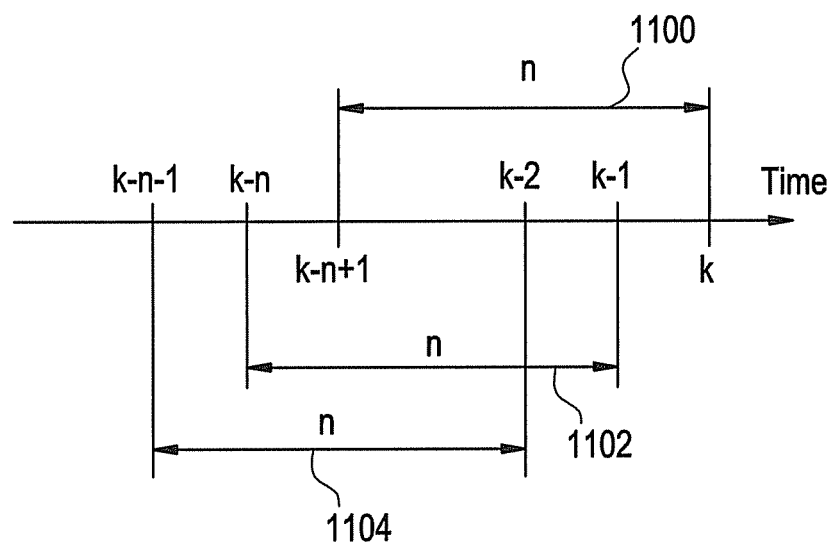
FIG. 58 is a diagram showing various windows for a moving average filter.

This is known as a moving average because the average at each k'th instant is based on the most recent set of n values. In other words, at any instant, a moving window of n values is used to calculate the average of the data sequence. For example, in FIG. 58, there are three windows 1100, 1102, and 1103 shown, each consisting of n values.

When used as a filter, the value of $\overline{x}_k$ is taken as the filtered value of $x_k$. The expression is a recursive one, because the value of $\overline{x}_k$ calculated using its previous value, $\overline{x}_{k-1}$ as reference.

It can be seen that with the recursive calculation, it is only necessary to perform one division, one addition and one subtraction operation. This is always the case, regardless of the number of data points (n) considered. However, calculating the current filtered value requires the use of $x_{k-N}$, i.e. the measurement n time-steps in the past.

Once the pre-filtering 1020 and the moving average filter 1030 are completed, the target values and correction factors can be calculated at 1040, and then the data values can be corrected at 1050.

It is first necessary to define and calculate a number of values to be used in the value correction (i.e., perform the calculations at 1040).

The target gain $G_{cal}$ is calculated according to the equation $G_{cal} = (ave\_max_A - ave\_min_A)/2$.

The target offset $OFFSET_{cal}$ is calculated according to the equation $OFFSET_{cal} = (ave\_max_A + ave\_min_A)/2$.

The gain of the data sample $G_A$ is calculated according to the equation $G_A = (max_A - min_A)/2$.

The offset of the data sample $OFFSET_A$ is calculated according to the equation $OFFSET_A = (max_A + min_A)/2$.

The gain correction factor $GF_A$ is calculated according to the equation $GF_A = G_{cal}/G_A$.

The offset correction factor $\Delta OFF_A$ is calculated according to the equation $\Delta OFF_A = OFFSET_{cal} - OFFSET_A$.

Using these calculated values from 1040, the first fine count 1012 values can be corrected in value correction 1050 according to the equation:

$$CFC_A = (GF_A * FC_A) + \Delta OFF_A,$$

where $FC_A$ is the fine count 1012 and $CFC_A$ is the corrected fine count for fine count 1012. In a possible alternative embodiment, the offset may be added first before multiplying by the gain correction factor, i.e., $CFC_A = GF_A * (FC_A + \Delta OFF_A)$.

The above equations refer to first fine count 1012, but it will be readily understand that the same calculations can be performed for second fine count 1014. Additionally, it will be understand that the same calculations can be formed for first and second fine counts on a plurality of read heads.

Once the corrected fine count is calculated, it is possible to correct the coarse count. Correction to the coarse count is necessary because an offset in the fine count can result in errors in the quantized quadrature signal.

Figure 59:
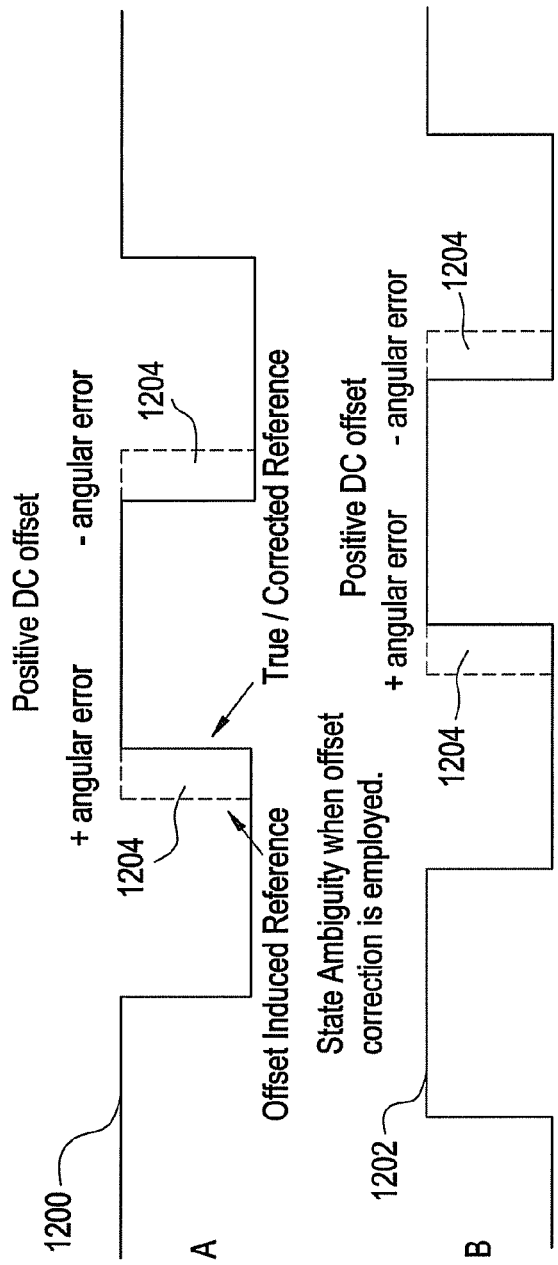
FIG. 59 is a diagram showing the error in a quadrature state for a positive DC offset.

For example, FIGS. 59-60 illustrate signals 1200, 1202 that make up a quadrature signal. FIG. 59 shows that if there is a positive DC offset, then high pulses will be erroneously widened, and low pulses will be erroneously shortened. In other words, if a measurement returns a value that is in regions 1204, it will incorrectly register has a high count instead of a low count. Accordingly, the coarse count of the read head will show the incorrect state.

FIG. 60 shows the opposite, i.e., if there is a negative DC offset, high pulses are erroneously narrowed, and low pulses are erroneously widened. In other words if a measurement returns a value that is in regions 1206, it will incorrectly register as a low count instead of a high count. Accordingly, the coarse count of the read head will show the incorrect state.

To correct this error in the coarse count, it is first necessary to define a quantization operator Q(x) such that:

Q(x)=0 for x<0; and
Q(x)=1 for x≧1.

The compensated fine counts $CFC_A$ calculated above should be symmetrical about $\Delta OFF_A$, and compensated fine counts $CFC_B$ should be symmetrical about $\Delta OFF_B$. Thus, the following equations are true:

$$Q(CFC_A - \Delta OFF_A) = 0 \text{ for } CFC_A < \Delta OFF_A \text{ and}$$

$$Q(CFC_A - \Delta OFF_A) = 1 \text{ for } CFC_A \geqq \Delta OFF_A.$$

A corrected state pair {A', B'} (i.e., a Gray Code value) can be calculated from the corrected fine counts as follows:

$$\{A', B'\} = \{Q(CFC_A - \Delta OFF_A); Q(CFC_B - \Delta OFF_B)\}.$$

The corrected state pair can be compared to the uncompensated state pair {A, B} indicated by the coarse count, and referencing state −(1, 1) (logically (H, H)). The coarse count can be adjusted by −1, 0, 1 according to the results of this comparison. The corrected coarse and fine counts can be re-assembled and passed to an angle computation module.

Thus, the gain and offset can be dynamically adjusted, allowing the use of multi-mode VSCEL lasers and simpler grating patterns. Additionally, with this structure and dynamic adjustment method, it is not necessary to spatially filter to eliminate higher order diffraction orders (beyond +/−1), which is required in conventional devices. Instead, the dynamically adjusted parameters account for DC offsets over temperature variations. This is a significant benefit over conventional devices because it results in simpler manufacturing and reduced manufacturing costs.

While the discussion above relates to angular encoders, it is also noted that similar concepts can also be readily applied to linear encoders as well. For example, instead of an encoder disk, an encoder scale with a diffraction grating can be used, and complementary index tracks (i.e., one with a reflective index mark and one with a non-reflective index mark) can be provided on the encoder scale, being provided either on one side of the diffraction grating, or on either side of the diffraction grating to sandwich the diffraction grating. The index marks can be positioned at a linear index coordinate as opposed to an angular index coordinate.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of dynamically adjusting gain and offset in an optical encoder, the method comprising:
   providing an encoder disk comprising a diffraction grating;
   illuminating the encoder disk with light;
   providing a detector structured to detect light diffracted from the diffraction grating and output a first fine count channel;
   calculating a first target gain and first target offset for the first fine count channel; and
   applying a correction to data sampled from the first fine count channel based on the first target gain and first target offset;
   wherein calculating the first target gain and the first target offset includes:
      determining a minimum value and maximum value in a set of data from the first fine count channel;
      calculating a moving average minimum based on the minimum value and minimum values from a plurality of prior sets of data from the first fine count channel;
      calculating a moving average maximum based on the maximum value and maximum values from the plurality of prior sets of data from the first fine count channel;
      calculating the first target gain according to the equation $G_{cal}=(\text{ave\_max}_A-\text{ave\_min}_A)/2$, where $G_{cal}$ is the first target gain, $\text{ave\_max}_A$ is the moving average maximum, and $\text{ave\_min}_A$ is the moving average minimum; and
      calculating the first target offset according to the equation $\text{OFFSET}_{cal}=(\text{ave\_max}_A+\text{ave\_min}_A)/2$, where $\text{OFFSET}_{cal}$ is the first target offset.

2. The method of claim 1, wherein applying a correction to data sampled from the first fine count channel comprises:
   calculating a gain $G_A$ of a data sample according to the equation $G_A=(\text{max}_A-\text{min}_A)/2$, wherein $\text{max}_A$ is a maximum of the data sample and $\text{min}_A$ is the minimum of the data sample;
   calculating an offset $\text{OFFSET}_A$ of the data sample according to the equation $\text{OFFSET}_A=(\text{max}_A+\text{min}_A)/2$;
   calculating a gain correction factor $GF_A$ according to the equation $GF_A=G_{cal}/G_A$, where $G_{cal}$ is the first target gain;
   calculating an offset correction factor $\Delta\text{OFF}_A$ according to the equation $\Delta\text{OFF}_A=\text{OFFSET}_{cal}-\text{OFFSET}_A$, where $\text{OFFSET}_{cal}$ is the first target offset; and
   correcting fine counts according to the equation $CFC_A=(GF_A*FC_A)+\Delta\text{OFF}_A$, where $FC_A$ is raw fine count data from the first fine count channel and $CFC_A$ is the corrected fine count data.

3. The method of claim 1, wherein the detector is structured to output a second fine count channel, and the method further comprises:
   calculating a second target gain and second target offset for the second fine count channel; and
   applying a correction to data sampled from the second fine count channel based on the second target gain and second target offset.

4. The method of claim 3, wherein the detector is structured to output a coarse count, and the method further comprises applying a correction to the course count based on the correction to data sampled from the first fine count channel and data sampled from the second fine count channel.

5. The method of claim 4, wherein applying a correction to the coarse count comprises:
   defining a quantization operator $Q(x)$ as:
      $Q(x)=0$ for $x<0$, and
      $Q(x)=1$ for $x\geq 0$;
   calculating a compensated state pair $\{A', B'\}$ according to the equation:

$$\{A', B'\}=\{Q(CFC_A-\Delta\text{OFF}_A), Q(CFC_B-\Delta\text{OFF}_B)\};$$

where $CFC_A$ is corrected data sampled from the first fine count channel, $CFC_B$ is corrected data sampled from the second fine count channel, $\Delta\text{OFF}_A$ is an offset correction value for the first fine count channel, and $\Delta\text{OFF}_B$ is an offset correction value for the second fine count channel;
   comparing the coarse count to the compensated state pair;
   adjusting the coarse count to match the compensated state pair.

6. The method of claim 1, wherein a plurality of detectors are provided, each of the plurality of detectors being structured to detect light diffracted from the diffraction grating and output a first fine count channel.

7. The method of claim 1, wherein the determining a minimum and maximum value in a set of data from the first fine count channel comprises:
   determining the three highest values and the three lowest values in the set of data;
   rejecting the minimum and maximum value if any of the three highest values differ from a median of the three highest values by greater than a predetermined amount or if any of the three lowest values differ from a median of the three lowest values by greater than a predetermined amount.

8. The method of claim 1, wherein the determining a minimum and maximum value in a set of data from the first fine count channel comprises:
   rejecting the minimum and the maximum if the minimum differs from the moving average minimum by more than a predetermined amount or if the maximum differs from the moving average maximum by more than a predetermined amount.

* * * * *